(12) United States Patent
Cheng et al.

(10) Patent No.: US 12,235,419 B2
(45) Date of Patent: Feb. 25, 2025

(54) OPTICAL IMAGING LENS GROUP

(71) Applicant: Zhejiang Sunny Optics Co., Ltd, Yuyao (CN)

(72) Inventors: Yifu Cheng, Yuyao (CN); Mengna Tang, Yuyao (CN); Jianke Wenren, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 689 days.

(21) Appl. No.: 17/529,822

(22) Filed: Nov. 18, 2021

(65) Prior Publication Data

US 2022/0187579 A1    Jun. 16, 2022

(30) Foreign Application Priority Data

Dec. 14, 2020 (CN) .......................... 202011464092.0

(51) Int. Cl.
*G02B 13/06* (2006.01)
*G02B 9/64* (2006.01)
*G02B 13/00* (2006.01)

(52) U.S. Cl.
CPC .............. *G02B 13/06* (2013.01); *G02B 9/64* (2013.01); *G02B 13/0045* (2013.01)

(58) Field of Classification Search
CPC ....... G02B 13/06; G02B 9/64; G02B 13/0045
USPC ....................................................... 359/754
See application file for complete search history.

(56) References Cited

U.S. PATENT DOCUMENTS

| 4,981,344 A | * | 1/1991 | Ueda ...................... G02B 13/24 |
| | | | 359/740 |
| 2017/0329108 A1 | * | 11/2017 | Hashimoto .............. G02B 9/64 |
| 2018/0329179 A1 | * | 11/2018 | Chang .................. G02B 13/146 |
| 2020/0132969 A1 | * | 4/2020 | Huang .............. H01L 27/14627 |
| 2021/0018728 A1 | * | 1/2021 | Li ...................... G02B 27/0025 |

FOREIGN PATENT DOCUMENTS

| CN | 106896473 A | 6/2017 |
| CN | 108681040 A | 10/2018 |

OTHER PUBLICATIONS

First Examination Report for Application No. 202114053138, dated Jun. 21, 2022, 6 pages.

* cited by examiner

*Primary Examiner* — Sharrief I Broome
(74) *Attorney, Agent, or Firm* — Barnes & Thornburg LLP

(57) ABSTRACT

An optical imaging lens group is disclosed. An implementation of the optical imaging lens group includes, sequentially along an optical axis from an object side to an image side: first to eighth lenses having refractive powers. The object-side surface of the first lens is a concave surface. The image-side surface of the third lens is a concave surface. Half of a maximal field-of-view Semi-FOV of an optical imaging system satisfies: Semi-FOV>60°, and an optical distortion Dist. of the optical imaging system satisfies: |Dist.|≤5.1%.

19 Claims, 12 Drawing Sheets

OPTICAL IMAGING LENS GROUP

CROSS-REFERENCE TO RELATED APPLICATION

This application claims benefit of priority to Chinese Patent Application No. 202011464092.0 filed on Dec. 14, 2020 before the China National Intellectual Property Administration, the entire disclosure of which is incorporated herein by reference in its entity.

TECHNICAL FIELD

The present disclosure relates to the field of optical imaging, and specifically to an optical imaging lens group comprising eight lenses.

BACKGROUND

With the continuous development of smart phones, the camera modules of new phones on the market become one of the highlights concerned by consumers. Therefore, the developing for the camera modules becomes the top priority of major smart phone manufacturers. A lens assembly such as an ultra-wide-angle lens assembly, a telephoto lens assembly, a lens assembly having a large aperture and a lens assembly having a large image plane is slowly becoming the standard configuration of the camera module of a smart phone. At present, the smart phone is configured with a plurality of lens assemblies of different types to achieve a higher imaging effect. Here, the ultra-wide-angle lens assembly has a wide field of view, and is unlike a fisheye lens assembly having a strong distortion. Moreover, the wide field of view of the ultra-wide-angle lens assembly makes the scenery appear more magnificent. Therefore, the ultra-wide-angle lens assembly is favored by more and more consumers. However, in some situations, the ultra-wide-angle lens assembly would cause a linear distortion in a photograph. Accordingly, a user is required to take time to correct the distortion in software, otherwise the distortion of the edge of a picture may ruin the effect.

Therefore, there is a need for an ultra-wide-angle lens assembly to obtain a smallest possible distortion under the premise of ensuring a wide field of view and an imaging quality, to achieve a better shooting effect.

SUMMARY

Embodiments of the present disclosure is intended to provide an ultra-wide-angle lens assembly comprising eight lenses, which obtains a smallest possible distortion under the premise of ensuring a wide field of view and imaging quality, to achieve a better shooting effect.

An aspect of the present disclosure is to provide an optical imaging lens group, comprising, sequentially along an optical axis from an object side to an image side: a first lens, having a refractive power, an object-side surface of the first lens being a concave surface; a second lens, having a refractive power; a third lens, having a refractive power, an image-side surface of the third lens being a concave surface; a fourth lens, having a refractive power; a fifth lens, having a refractive power; a sixth lens, having a refractive power; a seventh lens, having a refractive power; and an eighth lens, having a refractive power.

Here, half of a maximal field-of-view Semi-FOV of the optical imaging system satisfies: Semi-FOV>60°, and an optical distortion Dist. of the optical imaging system satisfies: $|Dist.| \leq 5.1\%$.

According to an implementation of the present disclosure, an effective focal length f7 of the seventh lens and an effective focal length f8 of the eighth lens satisfy: $0<f8/(f8-f7)<1.0$.

According to an implementation of the present disclosure, a combined focal length f23 of the second lens and the third lens and a combined focal length f456 of the fourth lens, the fifth lens and the sixth lens satisfy: $0.3<f456/f23<1.3$.

According to an implementation of the present disclosure, a radius of curvature R16 of an image-side surface of the eighth lens and a maximal effective radius DT82 of the image-side surface of the eighth lens satisfy: $0<R16/DT82<1.5$.

According to an implementation of the present disclosure, a center thickness CT5 of the fifth lens on the optical axis and an edge thickness ET5 of the fifth lens satisfy: $0<ET5/CT5<1.0$.

According to an implementation of the present disclosure, a center thickness CT8 of the eighth lens on the optical axis and an edge thickness ET8 of the eighth lens satisfy: $0<CT8/ET8<1.0$.

According to an implementation of the present disclosure, an edge thickness ET1 of the first lens and an axial distance SAG12 from an intersection point of an image-side surface of the first lens and the optical axis to a vertex of an effective radius of the image-side surface of the first lens satisfy: $0.5<ET1/SAG12<1.0$.

According to an implementation of the present disclosure, an axial distance SAG21 from an intersection point of an object-side surface of the second lens and the optical axis to a vertex of an effective radius of the object-side surface of the second lens and an axial distance SAG22 from an intersection point of an image-side surface of the second lens and the optical axis to a vertex of an effective radius of the image-side surface of the second lens satisfy: $0.5<SAG22/SAG21<1.5$.

According to an implementation of the present disclosure, an edge thickness ET6 of the sixth lens and an edge thickness ET7 of the seventh lens satisfy: $0<ET7/ET6<0.5$.

According to an implementation of the present disclosure, an effective focal length f1 of the first lens, a radius of curvature R1 of the object-side surface of the first lens, and a radius of curvature R2 of the image-side surface of the first lens satisfy: $0<f1/(R1+R2)<1.0$.

According to an implementation of the present disclosure, an effective focal length f4 of the fourth lens, an effective focal length f5 of the fifth lens and an effective focal length f6 of the sixth lens satisfy: $0.5<(f5-f6)/f4<2.0$.

According to an implementation of the present disclosure, a radius of curvature R3 of the object-side surface of the second lens, a radius of curvature R5 of an object-side surface of the third lens and a radius of curvature R6 of the image-side surface of the third lens satisfy: $0<R3/(R5+R6)<1.0$.

According to an implementation of the present disclosure, a radius of curvature R13 of an object-side surface of the seventh lens and a radius of curvature R14 of an image-side surface of the seventh lens satisfy: $0<R14/(R14-R13)<1.0$.

According to an implementation of the present disclosure, a radius of curvature R9 of an object-side surface of the fifth lens and a radius of curvature R10 of an image-side surface of the fifth lens satisfy: $0.5<R9/(R9-R10)<1.0$.

According to an implementation of the present disclosure, a center thickness CT6 of the sixth lens on the optical axis and a maximal effective radius DT61 of an object-side surface of the sixth lens satisfy: $0.2<CT6/DT61<0.7$.

According to an implementation of the present disclosure, a center thickness CT1 of the first lens on the optical axis, a center thickness CT2 of the second lens on the optical axis, a center thickness CT3 of the third lens on the optical axis and a center thickness CT4 of the fourth lens on the optical axis satisfy: $0.3<(CT1+CT2)/(CT3+CT4)<0.8$.

According to an implementation of the present disclosure, a center thickness CT7 of the seventh lens on the optical axis and a sum of air spacings $\Sigma AT$ between any two adjacent lenses in the first to eighth lenses on the optical axis satisfy: $0.3<CT7/\Sigma AT<0.8$.

According to an implementation of the present disclosure, the second lens has a positive refractive power, and the object-side surface of the second lens is a convex surface; the fifth lens has a positive refractive power, an object-side surface of the fifth lens is a convex surface, and an image-side surface of the fifth lens is a convex surface; the sixth lens has a negative refractive power; an object-side surface of the seventh lens is a convex surface, and an image-side surface of the seventh lens is a convex surface; and the eighth lens has a negative refractive power, and the image-side surface of the eighth lens is a concave surface.

Another aspect of the present disclosure is to provide an optical imaging lens group, comprising, sequentially along an optical axis from an object side to an image side: a first lens, having a refractive power, an object-side surface of the first lens being a concave surface; a second lens, having a positive refractive power, and the object-side surface of the second lens is a convex surface; a third lens, having a refractive power, an image-side surface of the third lens being a concave surface; a fourth lens, having a refractive power; a fifth lens, having a positive refractive power, an object-side surface of the fifth lens is a convex surface, and an image-side surface of the fifth lens is a convex surface; a sixth lens, having a negative refractive power; a seventh lens, having a refractive power, an object-side surface of the seventh lens is a convex surface, and an image-side surface of the seventh lens is a convex surface; and an eighth lens, having a negative refractive power, and the image-side surface of the eighth lens is a concave surface.

Here, the lenses are independent of each other, and have an air spacing on the optical axis between them. Half of a maximal field-of-view Semi-FOV of the optical imaging system satisfies: Semi-FOV>60°; and a center thickness CT1 of the first lens on the optical axis, a center thickness CT2 of the second lens on the optical axis, a center thickness CT3 of the third lens on the optical axis and a center thickness CT4 of the fourth lens on the optical axis satisfy: $0.3(CT1+CT2)/(CT3+CT4)<0.8$.

The beneficial effects of the present disclosure are as follows:

The optical imaging lens group provided in the present disclosure includes a plurality of lenses, for example, eight lenses, such as a first lens to an eighth lens. By reasonably distributing the surface types of the first lens and the third lens, the spherical aberration and chromatic aberration generated by the two lenses can be effectively balanced, and a better refractive power can be obtained while ensuring the manufacturability, thereby improving the imaging quality. The half of the maximal field-of-view Semi-FOV of the optical imaging system is controlled to be greater than 60°, which is not only conductive to obtaining a larger field of view for a photographed object during the actual photographing, but also means that a foreground may be added to a landscape photograph during the photographing. Accordingly, more background space is given to a human image, which makes the consumer feel better. Under the premise of ensuring a wide field of view and an imaging quality, a better shooting effect can be achieved by reasonably controlling the optical distortion.

BRIEF DESCRIPTION OF THE DRAWINGS

In order to explain the technical solution in embodiments of the present disclosure more clearly, the accompanying drawings used in the description for the embodiments will be briefly introduced below. Clearly, the accompanying drawings in the following description are only some embodiments of the present disclosure. It is also possible for those of ordinary skill in the art to obtain other drawings according to these drawings, without any creative effort.

DETAILED DESCRIPTION OF EMBODIMENTS

Figure 1:
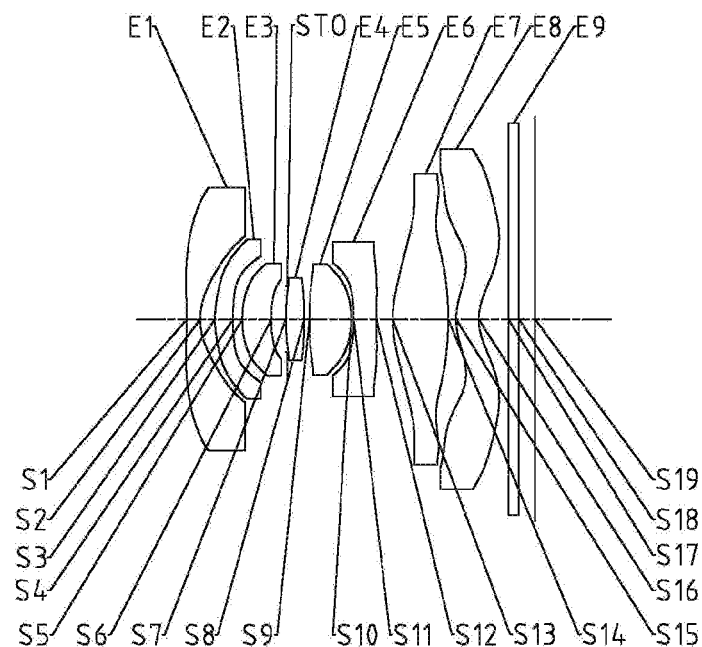
FIG. 1 is a schematic structural diagram of an optical imaging lens group according to Embodiment 1 of the present disclosure.

The technical solution in embodiments of the present disclosure will be clearly and completely described below in combination with the accompanying drawings in embodiments of the present disclosure. Clearly, the described embodiments are only some embodiments of the present disclosure, rather than all of the embodiments. Based on embodiments in the present disclosure, all other embodiments obtained by those of ordinary skill in the art without creative efforts shall fall within the scope of protection of the present disclosure.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of" when preceding a list of listed features, modify the entire list of features rather than an individual element in the list. Further, the use of "may" when describing the implementations of the present disclosure, relates to "one or more implementations of the present disclosure." Also, the term "exemplary" is intended to refer to an example or illustration.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the description for embodiments of the present disclosure, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

Unless otherwise defined, all terms (including technical and scientific terms) used herein have the same meaning as commonly understood by those of ordinary skill in the art to which embodiments of the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Features, principles, and other aspects of the present disclosure will be described below in detail with reference to the accompanying drawings and in combination with the embodiments.

Exemplary Implementations

An optical imaging lens group according to exemplary implementations of the present disclosure includes eight lenses, the optical imaging lens group including, sequentially along an optical axis from an object side to an image side, a first lens, a second lens, a third lens, a fourth lens, a fifth lens, a sixth lens, a seventh lens and an eighth lens. Here, the lenses are independent of each other, and have an air spacing on the optical axis.

In the exemplary implementations, the first lens may have a positive refractive power or a negative refractive power, and an object-side surface of the first lens is a concave surface. The second lens may have a positive refractive power or a negative refractive power. The third lens may have a positive refractive power or a negative refractive power, and an image-side surface of the third lens is a concave surface. The fourth lens may have a positive refractive power or a negative refractive power. The fifth lens may have a positive refractive power or a negative refractive power. The sixth lens may have a positive refractive power or a negative refractive power. The seventh lens may have a positive refractive power or a negative refractive power. The eighth lens may have a positive refractive power or a negative refractive power. By reasonably distributing the surface types of the first lens and the third lens, the spherical aberration and chromatic aberration generated by the two lenses can be effectively balanced, and a better refractive power can be obtained while ensuring the manufacturability, thereby improving the imaging quality.

In the exemplary implementations, the conditional expression that half of a maximal field-of-view Semi-FOV of an optical imaging system satisfies is: Semi-FOV>60°. The half of the maximal field-of-view Semi-FOV of the optical imaging system is controlled to be greater than 60°, which is not only conductive to obtaining a larger field of view for a photographed object during the actual photographing, but also means that a foreground may be added to a landscape photograph during the photographing. Accordingly, more background space is given to a human image, which makes the consumer feel better. More specifically, Semi-FOV satisfies: 61.5°<Semi-FOV<65.0°.

In the exemplary implementations, the conditional expression that an optical distortion Dist. of the optical imaging system satisfies is: |Dist.|≤5.1%. Under the premise of ensuring a wide field of view and an imaging quality, a better shooting effect can be achieved by reasonably controlling the optical distortion. More specifically, Dist. satisfies: 3.04%≤|Dist.|≤5.10%.

In the exemplary implementations, the conditional expression that an effective focal length f7 of the seventh lens and an effective focal length f8 of the eighth lens satisfy is: 0<f8/(f8−f7)<1.0. The refractive powers of the seventh lens and the eighth lens are reasonably distributed, which on the one hand makes it possible to better balance the distortion and astigmatism of the entire system, and which on the other hand is conductive to acquiring a larger image plane, thereby having a higher imaging quality. More specifically, f7 and f8 satisfy: 0.53<f8/(f8−f7)<0.76.

In the exemplary implementations, the conditional expression that a combined focal length f23 of the second lens and the third lens and a combined focal length f456 of the fourth lens, the fifth lens and the sixth lens satisfy is: 0.3<f456/f23<1.3. By reasonably distributing the combined focal length f23 of the second lens and the third lens and the combined focal length f456 of the fourth lens, the fifth lens and the sixth lens, not only the sensitivity of the five lenses can be reduced to avoid a too strict tolerance requirement, but also the astigmatism, the spherical aberration, etc. that are caused by the two groups of lenses can be better complemented and eliminated, thereby improving the overall imaging quality and obtaining better image resolution. More specifically, f23 and f456 satisfy: 0.38<f456/f23<1.10.

In the exemplary implementations, the conditional expression that a radius of curvature R16 of an image-side surface of the eighth lens and a maximal effective radius DT82 of the image-side surface of the eighth lens satisfy is: 0<R16/DT82<1.5. The radius of curvature and the maximal effective radius of the image-side surface of the eighth lens are reasonably controlled. Accordingly, on the one hand, the astigmatism and distortion between the eighth lens and the image plane are effectively balanced, such that the lens assembly can maintain a better imaging quality. Moreover, the problem that the processing is difficult in practice is avoided through a reasonable radius of curvature. On the other hand, the vignetting value of the system can be effectively controlled, and the part of light that results in a poor imaging quality can be intercepted, thereby improving the resolution of the entire system. More specifically, R16 and DT82 satisfy: 0.30<R16/DT82<1.21.

In the exemplary implementations, the conditional expression that a center thickness CT5 of the fifth lens on the optical axis and an edge thickness ET5 of the fifth lens satisfy is: 0<ET5/CT5<1.0. By reasonably controlling the ratio of the center thickness of the fifth lens to the edge thickness of the fifth lens, the processing and assembly techniques of the lens are ensured, and problems affecting the quality of the lens assembly (e.g., a problem that the actual adjusting is difficult due to a too thin lens, and a problem that the lens is easily deformed during assembly) are avoided. More specifically, CT5 and ET5 satisfy: 0.23<ET5/CT5<0.49.

In the exemplary implementations, the conditional expression that a center thickness CT8 of the eighth lens on the optical axis and an edge thickness ET8 of the eighth lens satisfy is: 0<CT8/ET8<1.0. The ratio of the center thickness of the eighth lens to the edge thickness of the eighth lens is reasonably controlled. Accordingly, on the one hand, the distortion and field curvature of the entire system can be better balanced. On the other hand, it is ensured that the last lens is not easily deformed during assembly, which is of great help to the stability of the field curvature. Moreover, there is more space for the molding and adjusting, to avoid the risk of stray light caused by an appearance problem of the eighth lens. More specifically, CT8 and ET8 satisfy: 0.22<CT8/ET8<0.70.

In the exemplary implementations, the conditional expression that an edge thickness ET1 of the first lens and an axial distance SAG12 from an intersection point of an image-side surface of the first lens and the optical axis to a vertex of an effective radius of the image-side surface of the first lens satisfy is: 0.5<ET1/SAG12<1.0. The ratio of the sagittal height of the image-side surface of the first lens to the edge thickness is reasonably controlled. Accordingly, on the one hand, it is avoided that the processing is difficult in practice, and the sensitivity of the first lens is reduced to avoid a too strict tolerance requirement. On the other hand, it is ensured that the first lens has an enough refractive power, which provides an enough back focus. More specifically, ET1 and SAG12 satisfy: 0.62<ET1/SAG12<0.82.

In the exemplary implementations, the conditional expression that an axial distance SAG21 from an intersection point of an object-side surface of the second lens and the optical axis to a vertex of an effective radius of the object-side surface of the second lens and an axial distance SAG22 from an intersection point of an image-side surface of the second lens and the optical axis to a vertex of an effective radius of the image-side surface of the second lens satisfy is: 0.5<SAG22/SAG21<1.5. The ratio of the sagittal height of the image-side surface of the second lens to the sagittal height of the object-side surface of the second lens is reasonably controlled. Accordingly, on the one hand, it is avoided that the processing is difficult in practice, and the sensitivity of the second lens is reduced to avoid a too strict tolerance requirement. On the other hand, it is ensured that the second lens has an enough refractive power, which provides an enough back focus. More specifically, SAG21 and SAG22 satisfy: 0.86<SAG22/SAG21<1.10.

In the exemplary implementations, the conditional expression that an edge thickness ET6 of the sixth lens and an edge thickness ET7 of the seventh lens satisfy is: 0<ET7/ET6<0.5. The ratio of the edge thicknesses of the sixth lens and the seventh lens is reasonably controlled. Accordingly, on the one hand, the chromatic aberration of the entire system can be better balanced. On the other hand, it is avoided that the processing is difficult in practice, to prevent the deformation during assembly, which is of great help to the stability of the field curvature. More specifically, ET6 and ET7 satisfy: 0.21<ET7/ET6<0.54.

In the exemplary implementations, the conditional expression that an effective focal length f1 of the first lens, a radius of curvature R1 of the object-side surface of the first lens, and a radius of curvature R2 of the image-side surface of the first lens satisfy is: 0<f1/(R1+R2)<1.0. By reasonably controlling the range of the conditional expression, the deflection of light in the first lens can be relieved, thereby reducing the sensitivity of the lens. Moreover, a series of processing problems caused by the poor manufacturability of the first lens can be effectively avoided. In addition, the spherical aberration generated by the first lens can be reduced. More specifically, f1, R1 and R2 satisfy: 0.13<f1/(R1+R2)<0.40.

In the exemplary implementations, the conditional expression that an effective focal length f4 of the fourth lens, an effective focal length f5 of the fifth lens and an effective focal length f6 of the sixth lens satisfy is: 0.5<(f5-f6)/f4<2.0. By reasonably distributing the focal lengths of the fourth lens, the fifth lens and the sixth lens, the sensitivity problem caused due to the excessive focusing of the refractive powers can be effectively avoided, and the tolerance requirements are more in line with the existing process capability level, and can also be matched with each other to effectively balance the spherical aberration, the comatic aberration, the astigmatism, etc. of the system, thereby improving the overall imaging quality and obtaining better resolution. More specifically, f4, f5 and f6 satisfy: 0.53<(f5-f6)/f4<1.56.

In the exemplary implementations, the conditional expression that a radius of curvature R3 of the object-side surface of the second lens, a radius of curvature R5 of an object-side surface of the third lens and a radius of curvature R6 of the image-side surface of the third lens satisfy is: 0<R3/(R5+R6)<1.0. By reasonably controlling the ratio of the curvature of the object-side surface of the second lens to the sum of the curvature of the object-side surface of the third lens and the curvature of the image-side surface of the third lens, the problem of difficult processing that is caused by a too large inclination is avoided. Moreover, the two lenses can effectively balance the spherical aberration of the system and reduce the sensitivities of the first two lenses. More specifically, R3, R5 and R6 satisfy: $0.19<R3/(R5+R6)<0.69$.

In the exemplary implementations, the conditional expression that a radius of curvature R13 of an object-side surface of the seventh lens and a radius of curvature R14 of an image-side surface of the seventh lens satisfy is: $0<R14/(R14-R13)<1.0$. The ratio of the curvature of the object-side surface of the seventh lens to the curvature of the image-side surface of the seventh lens is reasonably controlled. Accordingly, on the one hand, the distortion and field curvature of the entire system can be better balanced. On the other hand, it is ensured that the lens is not easily deformed during assembly, which is of great help to the stability of the field curvature. More specifically, R13 and R14 satisfy: $0.42<R14/(R14-R13)<0.69$.

In the exemplary implementations, the conditional expression that a radius of curvature R9 of an object-side surface of the fifth lens and a radius of curvature R10 of an image-side surface of the fifth lens satisfy is: $0.5<R9/(R9-R10)<1.0$. By reasonably controlling the ratio of the curvature of the object-side surface of the fifth lens to the curvature of the image-side surface of the fifth lens, the astigmatism and comatic aberration between the fifth lens and the first to fourth lenses can be effectively balanced, which makes the lens assembly maintain a better imaging quality. Moreover, the sensitivity of the system is reduced, which can effectively avoid a series of processing problems caused by the poor manufacturability of the fifth lens. More specifically, R9 and R10 satisfy: $0.54<R9/(R9-R10)<0.86$.

In the exemplary implementations, the conditional expression that a center thickness CT6 of the sixth lens on the optical axis and a maximal effective radius DT61 of an object-side surface of the sixth lens satisfy is: $0.2<CT6/DT61<0.7$. The ratio of the center thickness of the sixth lens to the aperture of the sixth lens is reasonably controlled. Accordingly, on the one hand, the vignetting value of the system can be effectively controlled, and the part of light that results in a poor imaging quality can be intercepted, thereby improving the resolution of the entire system. On the other hand, the too large difference between the center thickness and the aperture is avoided, which ensures the stability during assembly. More specifically, CT6 and DT61 satisfy: $0.32<CT6/DT61<0.50$.

In the exemplary implementations, the conditional expression that a center thickness CT1 of the first lens on the optical axis, a center thickness CT2 of the second lens on the optical axis, a center thickness CT3 of the third lens on the optical axis and a center thickness CT4 of the fourth lens on the optical axis satisfy is: $0.3<(CT1+CT2)/(CT3+CT4)<0.8$. By reasonably distributing the center thicknesses of the first lens, the second lens, the third lens and the fourth lens on the optical axis, the manufacturability of the first four lenses can be ensured. In addition, a better refractive power can be obtained, and the astigmatism, the spherical aberration, etc. that are caused by the two groups of lenses can be complemented and eliminated, thereby improving the overall imaging quality and obtaining better image resolution. More specifically, CT1, CT2, CT3 and CT4 satisfy: $0.51<(CT1+CT2)/(CT3+CT4)<0.69$.

In the exemplary implementations, the conditional expression that a center thickness CT7 of the seventh lens on the optical axis and a sum of air spacings $\Sigma AT$ between any two adjacent lenses in the first to eighth lenses on the optical axis satisfy is: $0.3<CT7/\Sigma AT<0.8$. By reasonably controlling the ratio of the center thickness of the seventh lens to the sum of the air spacings on the optical axis, the processing and assembly characteristics can be ensured, to avoid problems such as a problem that the intervention between the front and rear lenses during assembly is caused due to a too small spacing, or a problem that the lens is difficultly formed and easily deformed during the assembly due to the too thin characteristic. At the same time, by reasonably adjusting the air spacing between the lenses, it is possible to better balance the distortion of the system and reduce the energy of a ghost image, to ensure that the system obtains a better imaging quality. More specifically, CT7 and $\Sigma AT$ satisfy: $0.48<CT7/\Sigma AT<0.78$.

In the exemplary implementations, the second lens has a positive refractive power, and the object-side surface of the second lens is a convex surface. The fifth lens has a positive refractive power, the object-side surface of the fifth lens is a convex surface, and the image-side surface of the fifth lens is a convex surface. The sixth lens has a negative refractive power. The object-side surface of the seventh lens is a convex surface, and the image-side surface of the seventh lens is a concave surface. The eighth lens has a negative refractive power, and the image-side surface of the eighth lens is a concave surface. By reasonably distributing the refractive powers and surface types of the fifth lens, the sixth lens, the seventh lens and the eighth lens, the spherical aberration, the chromatic aberration and the distortion that are generated by the four lenses can be effectively balanced. In addition, by reasonably controlling the refractive power and surface type of the eighth lens, it can be ensured that the eighth lens is not easily deformed during the assembly, and there is more space for the molding and adjusting, to avoid the risk of stray light caused by an appearance problem of the eighth lens.

In the exemplary implementations, the above optical imaging lens group may further include a diaphragm. The diaphragm may be disposed at an appropriate position as required, for example, the diaphragm may be disposed between the object side and the first lens. Alternatively, the optical imaging lens group may further include an optical filter for correcting color deviations and/or a protective glass for protecting a photosensitive element on the image plane.

The optical imaging lens group according to the above implementations of the present disclosure may use a plurality of lenses, for example, the eight lenses described above. By reasonably distributing the refractive powers and the surface types of the lenses, the center thicknesses of the lenses, the axial spacings between the lenses, etc., the optical imaging lens group has a large image plane, has the characteristics of a wide imaging range and a high imaging quality, and ensures the ultrathin characteristic of a mobile phone.

In the exemplary implementations, at least one of the surfaces of the lenses is an aspheric surface. That is, at least one of the surfaces from the object-side surface of the first lens to the image-side surface of the eighth lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, the seventh lens and the eighth lens is an aspheric surface. Alternatively, the object-side surface and the image-side surface of each of the first lens, the second lens, the third lens, the fourth lens, the fifth lens, the sixth lens, the seventh lens and the eighth lens are all aspheric surfaces.

However, it should be understood by those skilled in the art that the various results and advantages described in the present specification may be obtained by changing the number of the lenses constituting the optical imaging lens group without departing from the technical solution claimed by the present disclosure. For example, although the optical imaging lens group having eight lenses is described as an example in the implementations, the optical imaging lens group is not limited to the eight lenses. If desired, the optical imaging lens group may also include other numbers of lenses.

Specific embodiments of the optical imaging lens group applicable to the above embodiments are further described below with reference to the accompanying drawings.

Embodiment 1

FIG. 1 is a schematic structural diagram of a lens group in Embodiment 1 of an optical imaging lens group according to the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1-S18 and finally forms an image on the image plane S19.

As shown in Table 1, Table 1 is a table showing basic parameters of the optical imaging lens group in Embodiment 1. Here, the units of a radius of curvature, a thickness and a focal length are millimeters (mm).

TABLE 1

| surface number | surface type | radius of curvature | thickness/ distance | focal length | refractive index | abbe number | conic coefficient |
| --- | --- | --- | --- | --- | --- | --- | --- |
| OBJ | spherical | infinite | infinite | | | | |
| S1 | aspheric | −10.9311 | 0.3000 | −2.26 | 1.55 | 56.1 | 0.0000 |
| S2 | aspheric | 1.4015 | 0.3294 | | | | −1.0000 |
| S3 | aspheric | 2.3823 | 0.4019 | 6.54 | 1.57 | 38.0 | 0.0000 |
| S4 | aspheric | 6.1915 | 0.2067 | | | | 0.0000 |
| S5 | aspheric | 2.4050 | 0.6440 | 10.52 | 1.65 | 23.5 | 0.0000 |
| S6 | aspheric | 3.3352 | 0.3508 | | | | 0.0000 |
| STO | spherical | infinite | −0.0233 | | | | |
| S7 | aspheric | 7.0586 | 0.4078 | 7.08 | 1.55 | 56.1 | 0.0000 |
| S8 | aspheric | −8.3731 | 0.1153 | | | | 0.0000 |
| S9 | aspheric | 11.2154 | 0.9305 | 3.02 | 1.55 | 56.1 | 0.0000 |
| S10 | aspheric | −1.8730 | 0.0544 | | | | 0.0000 |
| S11 | aspheric | −3.9685 | 0.5000 | −3.77 | 1.67 | 20.4 | 0.0000 |
| S12 | aspheric | 7.2239 | 0.3642 | | | | 0.0000 |
| S13 | aspheric | 2.5466 | 1.2355 | 3.40 | 1.55 | 56.1 | −1.0000 |
| S14 | aspheric | −5.6444 | 0.1769 | | | | 0.0000 |
| S15 | aspheric | 1.6063 | 0.5000 | −11.05 | 1.65 | 23.5 | −1.0000 |
| S16 | aspheric | 1.1508 | 0.6630 | | | | −1.0000 |
| S17 | spherical | infinite | 0.2310 | | 1.52 | 64.2 | |
| S18 | spherical | infinite | 0.3618 | | | | |
| S19 | spherical | infinite | | | | | |

As shown in Table 2, in Embodiment 1, the total effective focal length of the optical imaging lens group is f=2.21 mm, and the distance from the object-side surface S1 of first lens E1 to the image plane S19 on the optical axis is TTL=7.75 mm. The half of the diagonal length of the effective pixel area on the image plane S19 is ImgH=4.50 mm. The half of the maximal field-of-view of an optical imaging system is Semi-FOV=64.5°.

TABLE 2

Embodiment 1

| | | | |
|---|---|---|---|
| f(mm) | 2.21 | TTL(mm) | 7.75 |
| ImgH(mm) | 4.50 | Semi-FOV(°) | 64.5 |
| f/EPD | 2.00 | \|Dist.\|(%) | 3.04 |
| f8/(f8 − f7) | 0.76 | f456/f23 | 1.10 |
| R16/DT82 | 0.30 | ET5/CT5 | 0.32 |
| CT8/ET8 | 0.70 | ET1/SAG12 | 0.82 |
| SAG22/SAG21 | 0.86 | ET7/ET6 | 0.54 |
| f1/(R1 + R2) | 0.24 | (f5 − f6)/f4 | 0.96 |
| R3/(R5 + R6) | 0.42 | R14/(R14 − R13) | 0.69 |
| R9/(R9 − R10) | 0.86 | CT6/DT61 | 0.40 |
| (CT1 + CT2)/(CT3 + CT4) | 0.67 | CT7/ΣAT | 0.78 |

The optical imaging lens group in Embodiment 1 satisfies:

Semi-FOV=64.5°, Semi-FOV being the half of the maximal field-of-view of the optical imaging system;

|Dist.|=3.04%, Dist. being the optical distortion of the optical imaging system;

f8/(f8−f7)=0.76, f7 being the effective focal length of the seventh lens and f8 being the effective focal length of the eighth lens;

f456/f23=1.10, f23 being the combined focal length of the second lens and the third lens, and f456 being the combined focal length of the fourth lens, the fifth lens and the sixth lens;

R16/DT82=0.30, R16 being the radius of curvature of the image-side surface of the eighth lens, and DT82 being the maximal effective radius of the image-side surface of the eighth lens;

ET5/CT5=0.32, CT5 being the center thickness of the fifth lens on the optical axis, and ET5 being the edge thickness of the fifth lens;

CT8/ET8=0.70, CT8 being the center thickness of the eighth lens on the optical axis, and ET8 being the edge thickness of the eighth lens;

ET1/SAG12=0.82, ET1 being the edge thickness of the first lens, and SAG12 being the axial distance from the intersection point of the image-side surface of the first lens and the optical axis to the vertex of the effective radius of the image-side surface of the first lens;

SAG22/SAG21=0.86, SAG21 being the axial distance from the intersection point of the object-side surface of the second lens and the optical axis to the vertex of the effective radius of the object-side surface of the second lens, and SAG22 being the axial distance from the intersection point of the image-side surface of the second lens and the optical axis to the vertex of the effective radius of the image-side surface of the second lens;

ET7/ET6=0.54, ET6 being the edge thickness of the sixth lens, and ET7 being the edge thickness of the seventh lens;

f1/(R1+R2)=0.24, f1 being the effective focal length of the first lens, R1 being the radius of curvature of the object-side surface of the first lens, and R2 being the radius of curvature of the image-side surface of the first lens;

(f5−f6)/f4=0.96, f4 being the effective focal length of the fourth lens, f5 being the effective focal length of the fifth lens, and f6 being the effective focal length of the sixth lens;

R3/(R5+R6)=0.42, R3 being the radius of curvature of the object-side surface of the second lens, R5 being the radius of curvature of the object-side surface of the third lens, and R6 being the radius of curvature of the image-side surface of the third lens;

R14/(R14−R13)=0.69, R13 being the radius of curvature of the object-side surface of the seventh lens, and R14 being the radius of curvature of the image-side surface of the seventh lens;

R9/(R9−R10)=0.86, R9 being the radius of curvature of the object-side surface of the fifth lens, and R10 being the radius of curvature of the image-side surface of the fifth lens;

CT6/DT61=0.40, CT6 being the center thickness of the sixth lens on the optical axis, and DT61 being the maximal effective radius of the object-side surface of the sixth lens;

(CT1+CT2)/(CT3+CT4)=0.67, CT1 being the center thickness of the first lens on the optical axis, CT2 being the center thickness of the second lens on the optical axis, CT3 being the center thickness of the third lens on the optical axis, and CT4 being the center thickness of the fourth lens on the optical axis; and CT7/ΣAT=0.78, CT7 being the center thickness of the seventh lens on the optical axis, and ΣAT being the sum of air spacings between any two adjacent lenses in the first to eighth lenses on the optical axis.

In Embodiment 1, the object-side surface and the image-side surface of any lens in the first to eighth lenses E1–E8 are both aspheric surfaces, and the surface type x of an aspheric lens may be defined using, but not limited to, the following formula:

$$x = \frac{ch^2}{1+\sqrt{1-(k+1)c^2h^2}} + \Sigma A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1); k is the conic coefficient; and Ai is the correction coefficient of an i-th order of the aspheric surface.

In Embodiment 1, the object-side surface and the image-side surface of any lens in the first to eighth lenses E1–E8 are both aspheric surfaces. Table 3 shows the high-order coefficients $A_4$, $A_6$, $A_8$, $A_{10}$, $A_{12}$, $A_{14}$, $A_{16}$, $A_{18}$, $A_{20}$ and $A_{22}$ applicable to the aspheric surfaces S1–S16 in Embodiment 1.

TABLE 3

| surface number | A4 | A6 | A8 | A10 | A12 |
|---|---|---|---|---|---|
| S1 | 4.3893E−02 | −1.3809E−02 | 3.0339E−03 | −4.1929E−04 | 3.5232E−05 |
| S2 | −6.0009E−02 | 2.6767E−02 | −1.2386E−02 | 2.8224E−03 | 2.6919E−04 |
| S3 | −1.0250E−01 | 3.2596E−02 | 6.2335E−02 | −5.9811E−02 | 2.1837E−02 |
| S4 | 4.3497E−02 | 2.5202E−02 | 7.8071E−02 | −6.3743E−02 | 1.7687E−02 |
| S5 | 5.8229E−02 | −6.2530E−03 | 5.5501E−02 | −5.9460E−02 | 2.9737E−02 |
| S6 | 9.0468E−02 | −4.7594E−02 | 4.7935E−01 | −1.0721E+00 | 1.4184E+00 |

TABLE 3-continued

| | | | | | |
|---|---|---|---|---|---|
| S7 | 1.6100E−02 | 3.8029E−02 | 1.8976E−01 | −1.4556E+00 | 4.1241E+00 |
| S8 | 9.2771E−03 | −8.3501E−02 | 3.0814E−01 | −6.9499E−01 | 9.0018E−01 |
| S9 | 3.6064E−02 | −2.2977E−02 | 8.3379E−03 | 2.0503E−02 | −4.6330E−02 |
| S10 | 7.9597E−02 | −1.4597E−01 | −3.7833E−02 | 1.1665E−01 | −4.7116E−02 |
| S11 | −1.3753E−02 | −5.1878E−02 | −2.2684E−02 | −6.3301E−02 | 1.1207E−01 |
| S12 | −1.4539E−01 | 1.4709E−01 | −1.1073E−01 | 5.0968E−02 | −1.2735E−02 |
| S13 | −5.9026E−02 | 1.7963E−02 | −3.6479E−03 | 4.5568E−04 | −3.6636E−05 |
| S14 | 4.5112E−02 | −4.1153E−02 | 1.6129E−02 | −3.0884E−03 | 3.1769E−04 |
| S15 | −1.0592E−01 | −1.5171E−02 | 1.1290E−02 | −2.1175E−03 | 1.9662E−04 |
| S16 | −1.7393E−01 | 4.2327E−02 | −7.3182E−03 | 8.4574E−04 | −5.9967E−05 |

| surface number | A14 | A16 | A18 | A20 | A22 |
|---|---|---|---|---|---|
| S1 | −1.5963E−06 | 2.6623E−08 | 1.4333E−10 | 4.4779E−12 | 0.0000E+00 |
| S2 | −2.2439E−04 | 6.1713E−05 | −1.5429E−05 | 2.3907E−06 | −1.6103E−07 |
| S3 | −3.3184E−03 | −1.4311E−05 | 6.6623E−05 | −1.0306E−05 | 9.7823E−07 |
| S4 | −3.7396E−03 | 1.3858E−03 | −3.8733E−04 | 6.0832E−05 | 0.0000E+00 |
| S5 | −1.2156E−02 | 1.6639E−02 | −1.3245E−02 | 4.4924E−03 | −8.0105E−04 |
| S6 | −7.4109E−01 | 7.9999E−03 | 2.8195E−02 | 0.0000E+00 | 0.0000E+00 |
| S7 | −5.3081E+00 | 2.5599E+00 | 0.0000E+00 | 0.0000E+00 | 0.0000E+00 |
| S8 | −6.0961E−01 | 1.5832E−01 | 0.0000E+00 | 0.0000E+00 | 0.0000E+00 |
| S9 | 3.6731E−02 | −1.1056E−02 | 0.0000E+00 | 0.0000E+00 | 0.0000E+00 |
| S10 | 1.3337E−03 | 3.2255E−03 | −1.1646E−03 | 2.6455E−04 | 0.0000E+00 |
| S11 | −5.5757E−02 | 1.1608E−02 | −2.3275E−03 | 6.0593E−04 | 0.0000E+00 |
| S12 | 1.5598E−03 | −7.0297E−05 | 0.0000E+00 | 0.0000E+00 | 0.0000E+00 |
| S13 | 1.7615E−06 | −3.3454E−08 | −1.2725E−10 | −8.9297E−12 | 0.0000E+00 |
| S14 | −1.7011E−05 | 3.7025E−07 | 3.5271E−10 | −4.3800E−12 | 0.0000E+00 |
| S15 | −9.4121E−06 | 1.8607E−07 | 1.3467E−10 | −1.5590E−12 | −3.7193E−13 |
| S16 | 2.3205E−06 | −3.7267E−08 | −2.3638E−12 | 8.6040E−15 | 7.8461E−16 |

Figure 2A:
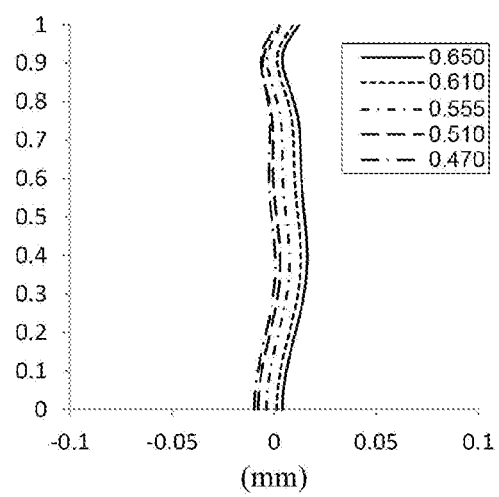
FIGS. 2a-2d respectively show a longitudinal aberration curve, an astigmatic curve, a distortion curve and a lateral color curve of an optical imaging lens group according to the Embodiment 1 of present disclosure.
Figure 2B:
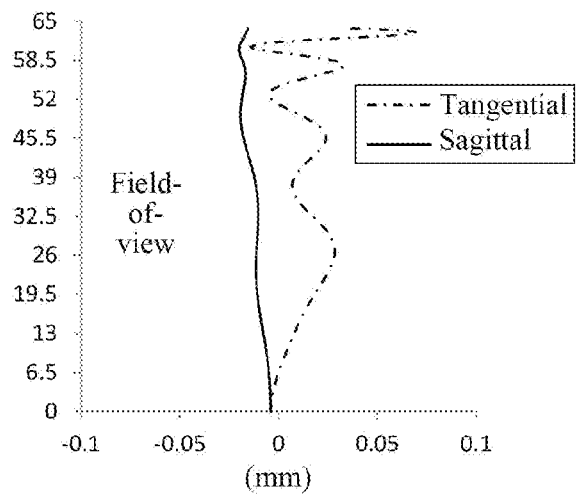
Figure 2C:
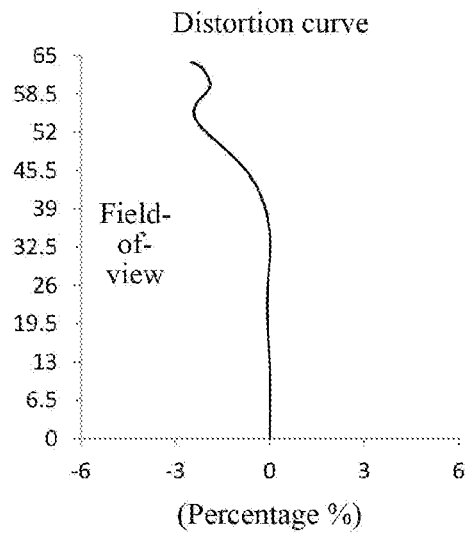
Figure 2D:
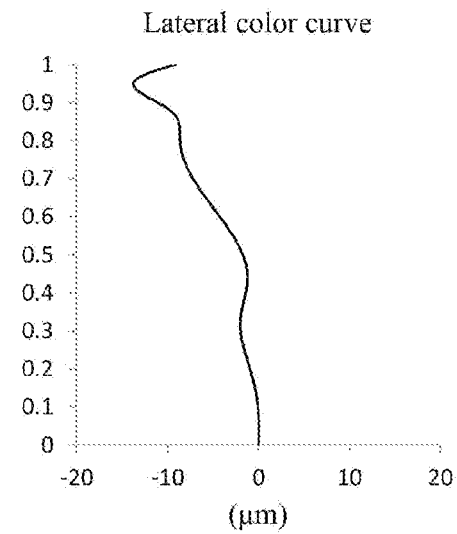

FIG. 2a illustrates a longitudinal aberration curve of the optical imaging lens group according to Embodiment 1, representing deviations of focal points of light of different wavelengths converged after passing through the lens assembly. FIG. 2b illustrates an astigmatic curve of the optical imaging lens group according to Embodiment 1, representing a curvature of a tangential image plane and a curvature of a sagittal image plane. FIG. 2c illustrates a distortion curve of the optical imaging lens group according to Embodiment 1, representing amounts of distortion corresponding to different image heights. FIG. 2d illustrates a lateral color curve of the optical imaging lens group according to Embodiment 1, representing deviations of different image heights on the image plane after light passes through the lens assembly. It can be seen from FIGS. 2a-2d that the optical imaging lens group given in Embodiment 1 can achieve a good imaging quality.

Embodiment 2

Figure 3:
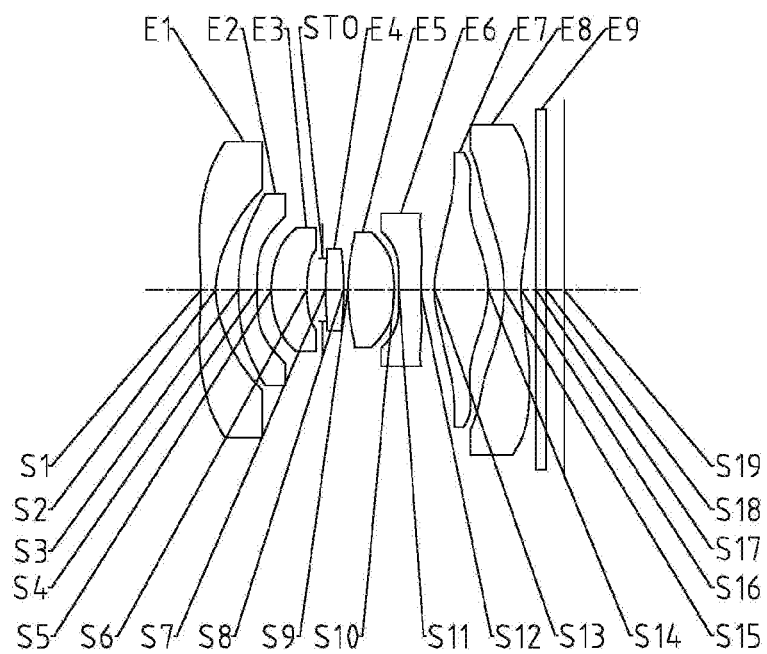
FIG. 3 is a schematic structural diagram of a lens group according to Embodiment 2 of the present disclosure.

FIG. 3 is a schematic structural diagram of an optical imaging lens group according to Embodiment 2 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 4, Table 4 is a table showing basic parameters of the optical imaging lens group in Embodiment 2. Here, the units of a radius of curvature, a thickness and a focal length are millimeters (mm).

TABLE 4

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −8.5280 | 0.2973 | −2.60 | 1.55 | 56.1 | 0.0000 |
| S2 | aspheric | 1.7223 | 0.4589 | | | | −1.0000 |

TABLE 4-continued

| surface number | surface type | radius of curvature | thickness/ distance | focal length | refractive index | abbe number | conic coefficient |
|---|---|---|---|---|---|---|---|
| S3 | aspheric | 3.7256 | 0.3794 | 11.91 | 1.57 | 38.0 | 0.0000 |
| S4 | aspheric | 8.4106 | 0.2982 | | | | 0.0000 |
| S5 | aspheric | 2.6160 | 0.7143 | 15.41 | 1.67 | 20.4 | 0.0000 |
| S6 | aspheric | 3.1280 | 0.3261 | | | | 0.0000 |
| STO | spherical | infinite | 0.0563 | | | | |
| S7 | aspheric | 7.4307 | 0.3670 | 9.77 | 1.55 | 56.1 | 0.0000 |
| S8 | aspheric | −18.5845 | 0.0878 | | | | 0.0000 |
| S9 | aspheric | 3.9589 | 0.9423 | 3.36 | 1.55 | 56.1 | 0.0000 |
| S10 | aspheric | −3.1377 | 0.0894 | | | | 0.0000 |
| S11 | aspheric | −32.9741 | 0.4453 | −8.80 | 1.67 | 20.4 | 0.0000 |
| S12 | aspheric | 7.1665 | 0.2795 | | | | 0.0000 |
| S13 | aspheric | 2.1138 | 1.0909 | 1.96 | 1.55 | 56.1 | −1.0000 |
| S14 | aspheric | −1.7675 | 0.3243 | | | | −1.0000 |
| S15 | aspheric | −3.2838 | 0.3422 | −2.36 | 1.67 | 20.4 | 0.0000 |
| S16 | aspheric | 3.1490 | 0.3014 | | | | −1.0000 |
| S17 | spherical | infinite | 0.2100 | | 1.52 | 64.2 | |
| S18 | spherical | infinite | 0.3655 | | | | |
| S19 | spherical | infinite | | | | | |

As shown in Table 5, in Embodiment 2, the total effective focal length of the optical imaging lens group is f=1.79 mm, and the distance from the object-side surface S1 of first lens E1 to the image plane S19 on the optical axis is TTL=7.38 mm. The half of the diagonal length of the effective pixel area on the image plane S19 is ImgH=3.85 mm. The half of the maximal field-of-view of an optical imaging system is Semi-FOV=65.0°. The parameter in each relational expression is as explained in the Embodiment 1, and the value of the each relational expression is listed in the following table.

TABLE 5

| Embodiment 2 | | | |
|---|---|---|---|
| f(mm) | 1.79 | TTL(mm) | 7.38 |
| ImgH(mm) | 3.85 | Semi-FOV(°) | 65.0 |
| f/EPD | 2.00 | |Dist.|(%) | 3.16 |

TABLE 5-continued

| Embodiment 2 | | | |
|---|---|---|---|
| f8/(f8 − f7) | 0.55 | f456/f23 | 0.51 |
| R16/DT82 | 0.94 | ET5/CT5 | 0.36 |
| CT8/ET8 | 0.40 | ET1/SAG12 | 0.80 |
| SAG22/SAG21 | 1.04 | ET7/ET6 | 0.23 |
| f1/(R1 + R2) | 0.38 | (f5 − f6)/f4 | 1.25 |
| R3/(R5 + R6) | 0.65 | R14/(R14 − R13) | 0.46 |
| R9/(R9 − R10) | 0.56 | CT6/DT61 | 0.37 |
| (CT1 + CT2)/(CT3 + CT4) | 0.63 | CT7/ΣAT | 0.57 |

In Embodiment 2, the object-side surface and the image-side surface of any lens in the first to eighth lenses E1–E8 are both aspheric surfaces. Table 6 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1–S16 in Embodiment 2.

TABLE 6

| surface number | A4 | A6 | A8 | A10 | A12 | A14 | A16 |
|---|---|---|---|---|---|---|---|
| S1 | 3.6640E−02 | −6.5709E−03 | 5.8693E−04 | 1.5971E−05 | −8.4627E−06 | 7.6018E−07 | −2.4050E−08 |
| S2 | −8.5751E−02 | 3.9713E−02 | 1.0568E−03 | −8.1312E−03 | 3.1110E−03 | −5.7568E−04 | 1.3189E−04 |
| S3 | −9.0719E−02 | 1.1155E−01 | −5.0873E−02 | 1.0578E−02 | −9.8775E−04 | 3.8174E−05 | −1.3020E−06 |
| S4 | 8.7681E−02 | 8.0096E−02 | −1.0942E−01 | 9.6081E−02 | −5.1829E−02 | 9.9234E−03 | 2.0426E−03 |
| S5 | 7.7626E−02 | −3.7440E−02 | 1.5515E−02 | 4.2072E−02 | −5.1532E−02 | 1.2834E−02 | 1.9309E−02 |
| S6 | 1.1583E−01 | −1.0213E−01 | 9.3417E−01 | −2.7374E+00 | 4.8429E+00 | −3.7846E+00 | 6.6747E−01 |
| S7 | 5.5463E−02 | 4.1338E−02 | −4.0725E−02 | 9.9527E−03 | 1.2608E−01 | −2.9659E−01 | 1.7824E−01 |
| S8 | −7.2458E−02 | 4.2482E−02 | 7.9076E−03 | −1.1529E−01 | 1.3215E−01 | −3.6946E−02 | −2.3169E−02 |
| S9 | −2.5912E−02 | 3.9908E−02 | −3.6043E−02 | 9.0671E−03 | 1.1169E−02 | −1.2105E−02 | 3.6499E−03 |
| S10 | 1.1298E−02 | −7.2179E−01 | 1.3290E+00 | −1.3285E+00 | 7.6941E−01 | −2.0706E−01 | −1.3514E−02 |
| S11 | 1.7711E−02 | −6.5725E−01 | 9.4908E−01 | −7.5187E−01 | 3.2989E−01 | −6.2867E−02 | 3.4058E−03 |
| S12 | −5.5552E−02 | −9.4507E−02 | 1.5665E−02 | −1.0629E−01 | 4.0927E−02 | −8.5081E−03 | 7.2939E−04 |
| S13 | −1.1564E−01 | 5.2889E−02 | −1.6013E−02 | 3.0406E−03 | −3.5725E−04 | 2.3498E−05 | −6.1729E−07 |
| S14 | 9.1460E−02 | −3.6070E−02 | 1.6310E−02 | −4.4337E−03 | 6.5324E−04 | −4.8964E−05 | 1.3769E−06 |
| S15 | 1.0055E−02 | −4.1505E−03 | 3.5828E−03 | −8.5826E−04 | 6.8702E−05 | 1.2254E−05 | −6.4798E−06 |
| S16 | −5.7188E−02 | 1.0505E−02 | −1.3449E−03 | 5.3454E−04 | −3.2640E−04 | 1.3021E−04 | −3.5122E−05 |

| surface number | A18 | A20 | A22 | A24 | A26 | A28 | A30 |
|---|---|---|---|---|---|---|---|
| S1 | −1.0758E−10 | −1.2408E−12 | 0.0000E+00 | 0.0000E+00 | 0.0000E+00 | 0.0000E+00 | 0.0000E+00 |
| S2 | −5.4033E−05 | 1.7748E−05 | −4.0605E−06 | 6.3564E−07 | −6.3846E−08 | 3.6421E−09 | −8.4662E−11 |
| S3 | 1.0890E−07 | −1.0451E−08 | −3.6741E−10 | 0.0000E+00 | 0.0000E+00 | 0.0000E+00 | 0.0000E+00 |
| S4 | −9.4541E−04 | −1.4575E−05 | 7.4673E−05 | −1.9688E−05 | 1.5389E−06 | 0.0000E+00 | 0.0000E+00 |
| S5 | −1.7122E−02 | 6.0615E−03 | −1.2338E−03 | 6.0698E−05 | 0.0000E+00 | 0.0000E+00 | 0.0000E+00 |
| S6 | 3.4424E−01 | −8.5120E−04 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |

TABLE 6-continued

| | | | | | | | |
|---|---|---|---|---|---|---|---|
| S9 | −8.7051E−06 | 0.0000E+00 | 0.0000E+00 | 0.0000E+00 | 0.0000E+00 | 0.0000E+00 | 0.0000E+00 |
| S10 | 2.5661E−02 | −8.6270E−03 | 1.6643E−03 | −1.5568E−05 | 0.0000E+00 | 0.0000E+00 | 0.0000E+00 |
| S11 | 9.2633E−04 | −2.3350E−04 | 1.8626E−05 | 0.0000E+00 | 0.0000E+00 | 0.0000E+00 | 0.0000E+00 |
| S12 | −2.5673E−09 | 0.0000E+00 | 0.0000E+00 | 0.0000E+00 | 0.0000E+00 | 0.0000E+00 | 0.0000E+00 |
| S13 | −2.8827E−09 | −5.9562E−11 | 0.0000E+00 | 0.0000E+00 | 0.0000E+00 | 0.0000E+00 | 0.0000E+00 |
| S14 | 7.4316E−09 | 1.6881E−10 | −1.2617E−13 | 0.0000E+00 | 0.0000E+00 | 0.0000E+00 | 0.0000E+00 |
| S15 | 1.7237E−06 | −3.1876E−07 | 4.1508E−08 | −3.7243E−09 | 2.1899E−10 | −7.5784E−12 | 1.1658E−13 |
| S16 | 6.6901E−06 | −9.1250E−07 | 8.8627E−08 | −5.9842E−09 | 2.6694E−10 | −7.0730E−12 | 8.4316E−14 |

Figure 4A:
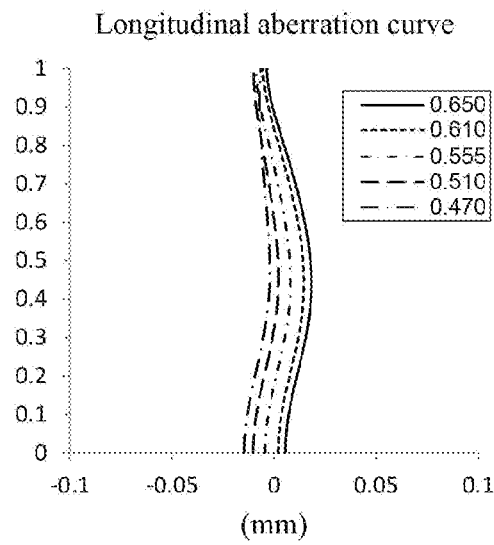
FIGS. 4a-4d respectively show a longitudinal aberration curve, an astigmatic curve, a distortion curve and a lateral color curve of an optical imaging lens group according to Embodiment 2 the present disclosure.
Figure 4B:
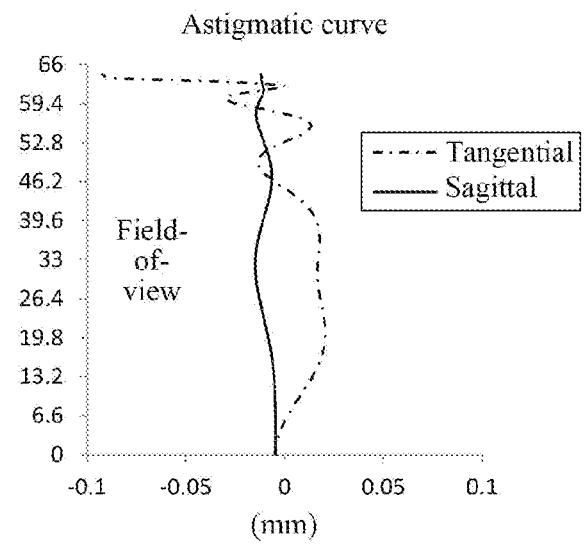
Figure 4C:
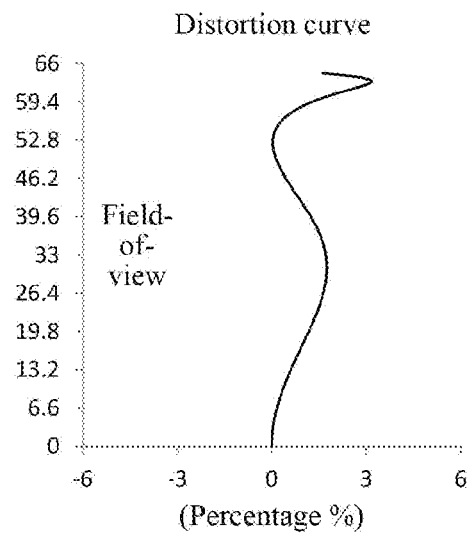
Figure 4D:
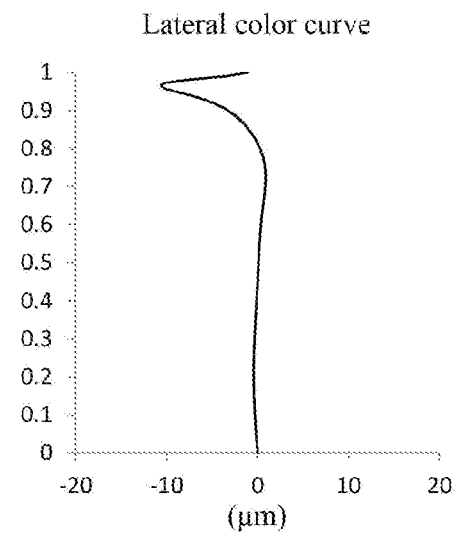

FIG. 4a illustrates a longitudinal aberration curve of the optical imaging lens group according to Embodiment 2, representing deviations of focal points of light of different wavelengths converged after passing through the lens assembly. FIG. 4b illustrates an astigmatic curve of the optical imaging lens group according to Embodiment 2, representing a curvature of a tangential image plane and a curvature of a sagittal image plane. FIG. 4c illustrates a distortion curve of the optical imaging lens group according to Embodiment 2, representing amounts of distortion corresponding to different image heights. FIG. 4d illustrates a lateral color curve of the optical imaging lens group according to Embodiment 2, representing deviations of different image heights on the image plane after light passes through the lens assembly. It can be seen from FIGS. 4a-4d that the optical imaging lens group given in Embodiment 2 can achieve a good imaging quality.

Embodiment 3

Figure 5:
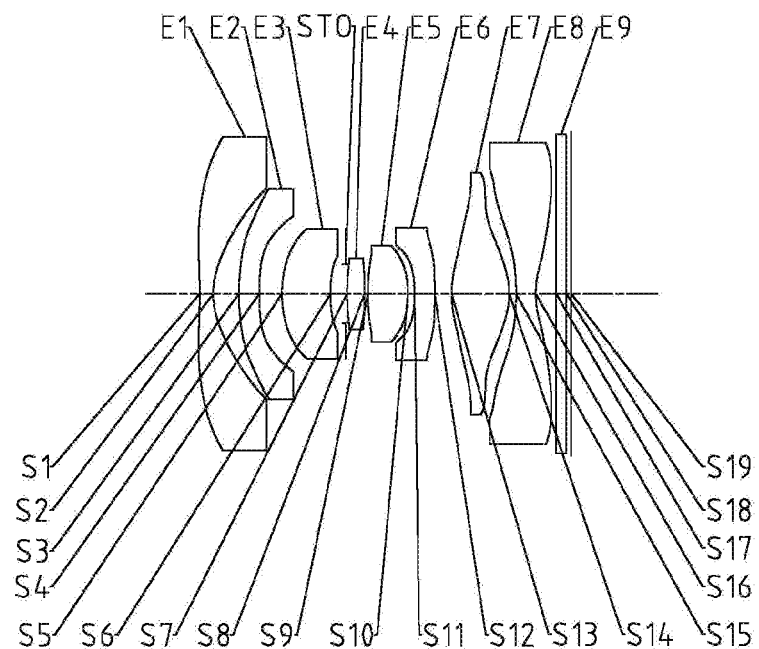
FIG. 5 is a schematic structural diagram of an optical imaging lens group according to Embodiment 3 the present disclosure.

FIG. 5 is a schematic structural diagram of an optical imaging lens group according to Embodiment 3 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 7, Table 7 is a table showing basic parameters of the optical imaging lens group in Embodiment 3. Here, the units of a radius of curvature, a thickness and a focal length are millimeters (mm).

TABLE 7

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −9.7962 | 0.2749 | −2.35 | 1.55 | 56.1 | 1.9847 |
| S2 | aspheric | 1.4941 | 0.5298 | | | | −1.3366 |
| S3 | aspheric | 3.6093 | 0.4216 | 14.61 | 1.57 | 38.0 | −0.3567 |
| S4 | aspheric | 6.3218 | 0.4689 | | | | 13.0762 |
| S5 | aspheric | 2.5221 | 1.0000 | 8.95 | 1.67 | 20.4 | −1.0780 |
| S6 | aspheric | 3.6800 | 0.3151 | | | | 1.0146 |
| STO | spherical | infinite | 0.0281 | | | | |
| S7 | aspheric | 5.4248 | 0.3598 | 7.13 | 1.55 | 56.1 | 26.2073 |
| S8 | aspheric | −13.4701 | 0.0685 | | | | −99.0000 |
| S9 | aspheric | 4.3714 | 0.8247 | 2.71 | 1.55 | 56.1 | 7.0916 |
| S10 | aspheric | −2.0864 | 0.1358 | | | | −0.8220 |
| S11 | aspheric | −3.0429 | 0.4157 | −4.72 | 1.67 | 20.4 | 5.3684 |
| S12 | aspheric | −100.0000 | 0.3498 | | | | 0.0000 |
| S13 | aspheric | 1.9906 | 1.1889 | 1.74 | 1.55 | 56.1 | −0.9070 |
| S14 | aspheric | −1.4412 | 0.1414 | | | | −0.9694 |
| S15 | aspheric | −3.5985 | 0.4045 | −2.04 | 1.67 | 20.4 | −0.7710 |
| S16 | aspheric | 2.2715 | 0.4247 | | | | −99.0000 |
| S17 | spherical | infinite | 0.2100 | | 1.52 | 64.2 | |
| S18 | spherical | infinite | 0.1000 | | | | |
| S19 | spherical | infinite | | | | | |

As shown in Table 8, in Embodiment 3, the total effective focal length of the optical imaging lens group is f=1.56 mm, and the distance from the object-side surface S1 of first lens E1 to the image plane S19 on the optical axis is TTL=7.66 mm. The half of the diagonal length of the effective pixel area on the image plane S19 is ImgH=3.34 mm. The half of the maximal field-of-view of an optical imaging system is Semi-FOV=65.0°. The parameter in each relational expression is as explained in the Embodiment 1, and the value of the each relational expression is listed in the following table.

TABLE 9

| surface number | A4 | A6 | A8 | A10 | A12 | A14 | A16 |
|---|---|---|---|---|---|---|---|
| S1 | 3.4818E−02 | −1.0524E−02 | 3.0602E−03 | −7.1703E−04 | 1.1917E−04 | −1.2991E−05 | 8.7261E−07 |
| S2 | −1.0637E−01 | 1.3757E−01 | −1.9905E−01 | 2.6243E−01 | −2.6456E−01 | 1.9476E−01 | −1.0416E−01 |
| S3 | −1.4667E−01 | 2.4336E−01 | −2.3399E−01 | 1.5649E−01 | −7.2103E−02 | 2.2155E−02 | −4.3879E−03 |
| S4 | −3.1309E−02 | 3.5291E−01 | −7.1890E−01 | 1.1420E+00 | −1.4514E+00 | 1.4243E+00 | −1.0308E+00 |
| S5 | 2.3524E−02 | 1.1073E−01 | −4.2330E−01 | 9.8070E−01 | −1.5173E+00 | 1.6478E+00 | −1.2615E+00 |
| S6 | 1.1078E−01 | −1.2363E−01 | 1.7580E+00 | −1.0237E+01 | 4.1241E+01 | −1.1009E+02 | 1.9369E+02 |
| S7 | 4.5262E−02 | −8.7834E−01 | 1.2499E+01 | −1.0060E+02 | 5.0333E+02 | −1.5827E+03 | 3.0372E+03 |
| S8 | −7.5698E−02 | 6.2139E−02 | −3.6353E−01 | 2.4916E+00 | −9.3068E+00 | 1.9738E+01 | −2.4027E+01 |
| S9 | −2.9346E−02 | 1.4160E−02 | 9.5120E−02 | −2.7669E−01 | 4.0219E−01 | −4.6078E−01 | 4.4455E−01 |
| S10 | 1.2190E−01 | −1.1784E+00 | 3.2906E+00 | −6.6357E+00 | 1.0026E+01 | −1.1198E+01 | 9.1161E+00 |
| S11 | 1.4990E−01 | −1.4837E+00 | 4.0504E+00 | −8.4504E+00 | 1.3565E+01 | −1.6340E+01 | 1.4349E+01 |
| S12 | −7.2635E−02 | −1.4157E−01 | 2.6854E−01 | −2.0850E−01 | 9.1875E−02 | −2.1859E−02 | 2.1459E−03 |
| S13 | −1.6124E−01 | 1.8424E−01 | −2.4240E−01 | 2.3266E−01 | −1.5444E−01 | 7.3731E−02 | −2.6148E−02 |
| S14 | 2.2264E−01 | −3.8082E−01 | 7.0715E−01 | −9.3976E−01 | 8.3097E−01 | −4.9809E−01 | 2.0847E−01 |
| S15 | 4.1312E−01 | −1.4746E+00 | 2.6120E+00 | −2.8714E+00 | 2.1273E+00 | −1.1051E+00 | 4.1148E−01 |
| S16 | 9.0485E−01 | −2.3301E+00 | 3.0052E+00 | −2.3798E+00 | 1.2564E+00 | −4.6246E−01 | 1.2179E−01 |

| surface number | A18 | A20 | A22 | A24 | A26 | A28 | A30 |
|---|---|---|---|---|---|---|---|
| S1 | −3.1991E−08 | 4.2817E−10 | 3.1900E−12 | 0.0000E+00 | 0.0000E+00 | 0.0000E+00 | 0.0000E+00 |
| S2 | 4.0481E−02 | −1.1385E−02 | 2.2879E−03 | −3.1966E−04 | 2.9457E−05 | −1.6075E−06 | 3.9295E−08 |
| S3 | 5.2341E−04 | −3.1017E−05 | 1.8105E−07 | 4.8710E−08 | 0.0000E+00 | 0.0000E+00 | 0.0000E+00 |
| S4 | 5.2734E−01 | −1.8319E−01 | 4.0875E−02 | −5.2666E−03 | 2.9719E−04 | 0.0000E+00 | 0.0000E+00 |
| S5 | 6.6699E−01 | −2.3114E−01 | 4.7072E−02 | −4.2676E−03 | 0.0000E+00 | 0.0000E+00 | 0.0000E+00 |
| S6 | −2.1366E+02 | 1.3275E+02 | −3.5260E+01 | 0.0000E+00 | 0.0000E+00 | 0.0000E+00 | 0.0000E+00 |
| S7 | −3.2496E+03 | 1.4858E+03 | 0.0000E+00 | 0.0000E+00 | 0.0000E+00 | 0.0000E+00 | 0.0000E+00 |
| S8 | 1.5481E+01 | −4.0440E+00 | 0.0000E+00 | 0.0000E+00 | 0.0000E+00 | 0.0000E+00 | 0.0000E+00 |
| S9 | −2.8566E−01 | 8.1417E−02 | 0.0000E+00 | 0.0000E+00 | 0.0000E+00 | 0.0000E+00 | 0.0000E+00 |
| S10 | −5.2678E+00 | 2.0466E+00 | −4.7827E−01 | 5.0631E−02 | 0.0000E+00 | 0.0000E+00 | 0.0000E+00 |
| S11 | −8.7135E+00 | 3.2744E+00 | −5.4046E−01 | −5.5828E−02 | 2.5913E−02 | 0.0000E+00 | 0.0000E+00 |
| S12 | −2.7899E−07 | 0.0000E+00 | 0.0000E+00 | 0.0000E+00 | 0.0000E+00 | 0.0000E+00 | 0.0000E+00 |
| S13 | 6.9997E−03 | −1.4182E−03 | 2.1516E−04 | −2.3745E−05 | 1.8000E−06 | −8.3589E−08 | 1.7855E−09 |
| S14 | −6.2141E−02 | 1.3280E−02 | −2.0206E−03 | 2.1365E−04 | −1.4920E−05 | 6.1848E−07 | −1.1524E−08 |
| S15 | −1.1101E−01 | 2.1711E−02 | −3.0459E−03 | 2.9854E−04 | −1.9402E−05 | 7.5091E−07 | −1.3096E−08 |
| S16 | −2.3240E−02 | 3.2187E−03 | −3.2020E−04 | 2.2288E−05 | −1.0301E−06 | 2.8388E−08 | −3.5297E−10 |

TABLE 8

| Embodiment 3 | | | |
|---|---|---|---|
| f(mm) | 1.56 | TTL(mm) | 7.66 |
| ImgH(mm) | 3.34 | Semi-FOV(°) | 65.0 |
| f/EPD | 2.00 | |Dist.|(%) | 4.99 |
| f8/(f8 − f7) | 0.54 | f456/f23 | 0.57 |
| R16/DT82 | 0.73 | ET5/CT5 | 0.49 |
| CT8/ET8 | 0.35 | ET1/SAG12 | 0.82 |
| SAG22/SAG21 | 1.10 | ET7/ET6 | 0.31 |
| f1/(R1 + R2) | 0.28 | (f5 − f6)/f4 | 1.04 |
| R3/(R5 + R6) | 0.58 | R14/(R14 − R13) | 0.42 |
| R9/(R9 − R10) | 0.68 | CT6/DT61 | 0.41 |
| (CT1 + CT2)/(CT3 + CT4) | 0.51 | CT7/ΣAT | 0.58 |

In Embodiment 3, the object-side surface and the image-side surface of any lens in the first to eighth lenses E1–E8 are both aspheric surfaces. Table 9 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1–S16 in Embodiment 3.

Figures 6A, 6B:
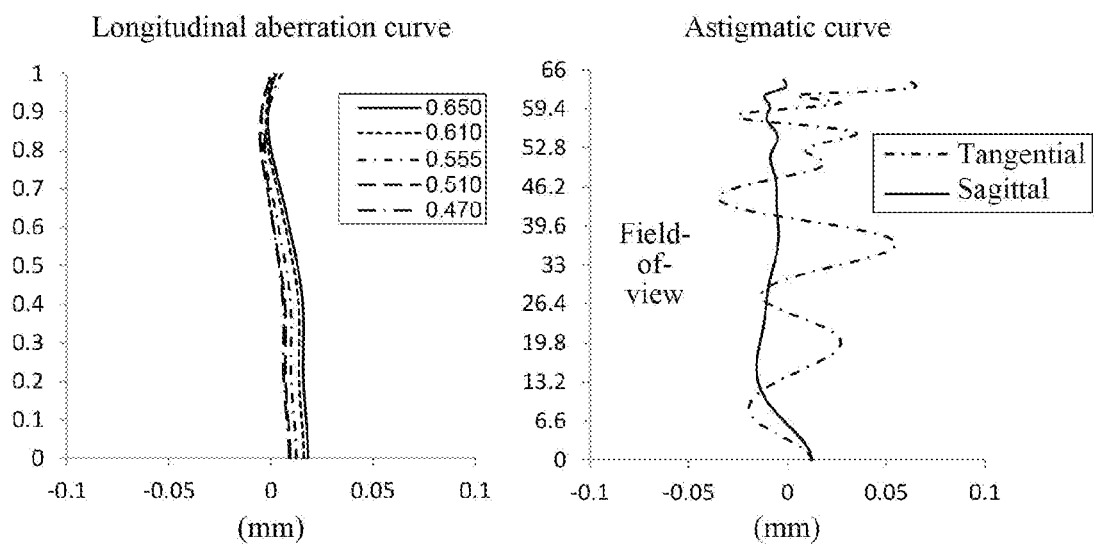
FIGS. 6a-6d respectively show a longitudinal aberration curve, an astigmatic curve, a distortion curve and a lateral color curve of the optical imaging lens group according to Embodiment 3 of the present disclosure.
Figure 6C:
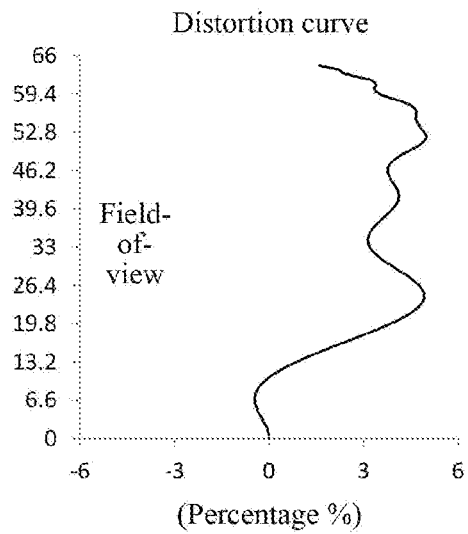
Figure 6D:
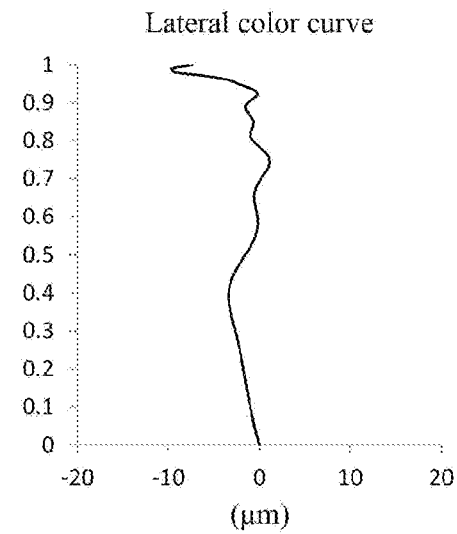

FIG. 6a illustrates a longitudinal aberration curve of the optical imaging lens group according to Embodiment 3, representing deviations of focal points of light of different wavelengths converged after passing through the lens assembly. FIG. 6b illustrates an astigmatic curve of the optical imaging lens group according to Embodiment 3, representing a curvature of a tangential image plane and a curvature of a sagittal image plane. FIG. 6c illustrates a distortion curve of the optical imaging lens group according to Embodiment 3, representing amounts of distortion corresponding to different image heights. FIG. 6d illustrates a lateral color curve of the optical imaging lens group according to Embodiment 3, representing deviations of different image heights on the image plane after light passes through the lens assembly. It can be seen from FIGS. 6a-6d that the optical imaging lens group given in Embodiment 3 can achieve a good imaging quality.

Embodiment 4

Figure 7:
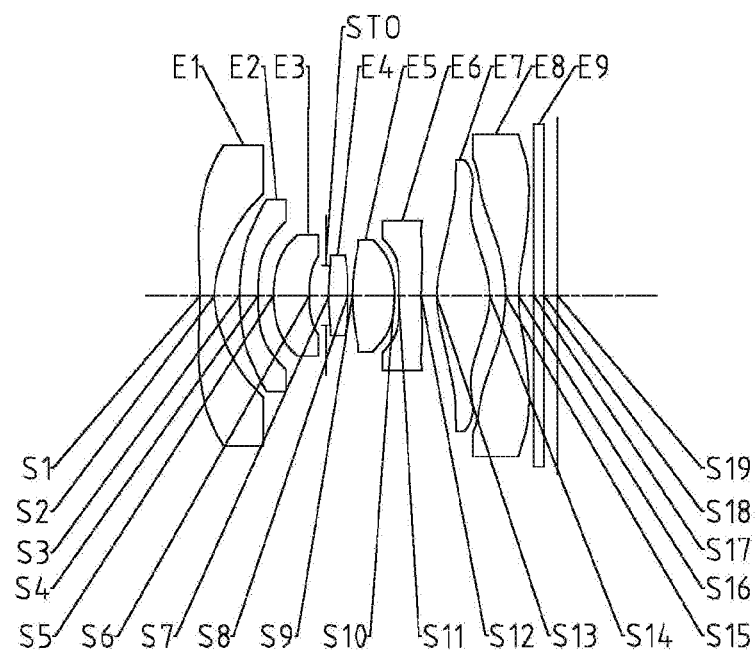
FIG. 7 is a schematic structural diagram of an optical imaging lens group according to Embodiment 4 of the present disclosure.

FIG. 7 is a schematic structural diagram of an optical imaging lens group according to Embodiment 4 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 10, Table 10 is a table showing basic parameters of the optical imaging lens group in Embodiment 4. Here, the units of a radius of curvature, a thickness and a focal length are millimeters (mm).

TABLE 10

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −8.2738 | 0.2979 | −2.62 | 1.55 | 56.1 | 0.0537 |
| S2 | aspheric | 1.7500 | 0.5197 | | | | −0.9822 |
| S3 | aspheric | 3.8279 | 0.3858 | 11.88 | 1.57 | 38.0 | −0.0448 |
| S4 | aspheric | 9.0053 | 0.3133 | | | | −18.9597 |
| S5 | aspheric | 2.6134 | 0.7396 | 17.44 | 1.67 | 20.4 | −0.1634 |
| S6 | aspheric | 2.9912 | 0.3436 | | | | 0.4993 |
| STO | spherical | infinite | 0.0634 | | | | |
| S7 | aspheric | 7.0670 | 0.3888 | 8.12 | 1.55 | 56.1 | 2.5573 |
| S8 | aspheric | −11.6463 | 0.0988 | | | | −22.0351 |
| S9 | aspheric | 4.1429 | 0.8639 | 3.44 | 1.55 | 56.1 | −0.0389 |
| S10 | aspheric | −3.1864 | 0.0921 | | | | −0.0412 |
| S11 | aspheric | 1134.2193 | 0.4637 | −9.22 | 1.67 | 20.4 | 50.0000 |
| S12 | aspheric | 6.1037 | 0.3179 | | | | −1.7654 |
| S13 | aspheric | 2.1131 | 1.0927 | 1.96 | 1.55 | 56.1 | −0.9923 |
| S14 | aspheric | −1.7750 | 0.3269 | | | | −0.9978 |
| S15 | aspheric | −3.2843 | 0.2707 | −2.34 | 1.67 | 20.4 | −0.0063 |
| S16 | aspheric | 3.0583 | 0.3134 | | | | −0.8923 |
| S17 | spherical | infinite | 0.2100 | | 1.52 | 64.2 | |
| S18 | spherical | infinite | 0.2798 | | | | |
| S19 | spherical | infinite | | | | | |

As shown in Table 11, in Embodiment 4, the total effective focal length of the optical imaging lens group is f=1.72 mm, and the distance from the object-side surface S1 of first lens E1 to the image plane S19 on the optical axis is TTL=7.38 mm. The half of the diagonal length of the effective pixel area on the image plane S19 is ImgH=3.69 mm. The half of the maximal field-of-view of an optical imaging system is Semi-FOV=65.0°. The parameter in each relational expression is as explained in the Embodiment 1, and the value of the each relational expression is listed in the following table.

TABLE 11

| Embodiment 4 | | | |
|---|---|---|---|
| f(mm) | 1.72 | TTL(mm) | 7.38 |
| ImgH(mm) | 3.69 | Semi-FOV(°) | 65.0 |
| f/EPD | 2.00 | |Dist.|(%) | 4.22 |
| f8/(f8 − f7) | 0.54 | f456/f23 | 0.46 |
| R16/DT82 | 0.92 | ET5/CT5 | 0.34 |
| CT8/ET8 | 0.29 | ET1/SAG12 | 0.82 |
| SAG22/SAG21 | 1.02 | ET7/ET6 | 0.21 |
| f1/(R1 + R2) | 0.40 | (f5 − f6)/f4 | 1.56 |

TABLE 11-continued

| Embodiment 4 | | | |
|---|---|---|---|
| R3/(R5 + R6) | 0.68 | R14/(R14 − R13) | 0.46 |
| R9/(R9 − R10) | 0.57 | CT6/DT61 | 0.39 |
| (CT1 + CT2)/(CT3 + CT4) | 0.61 | CT7/ΣAT | 0.53 |

In Embodiment 4, the object-side surface and the image-side surface of any lens in the first to eighth lenses E1–E8 are both aspheric surfaces. Table 12 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1–S16 in Embodiment 4.

TABLE 12

| surface number | A4 | A6 | A8 | A10 | A12 | A14 | A16 |
|---|---|---|---|---|---|---|---|
| S1 | 3.6600E−02 | −8.8451E−03 | 2.3243E−03 | −6.6035E−04 | 1.4840E−04 | −2.1683E−05 | 1.9184E−06 |
| S2 | −1.0422E−01 | 1.1331E−01 | −1.6334E−01 | 2.5914E−01 | −3.1939E−01 | 2.8232E−01 | −1.7855E−01 |
| S3 | −1.1122E−01 | 2.0401E−01 | −2.2702E−01 | 1.9778E−01 | −1.2375E−01 | 5.1836E−02 | −1.4128E−02 |
| S4 | 6.0733E−02 | 2.3664E−01 | −7.0320E−01 | 1.4890E+00 | −2.3342E+00 | 2.7046E+00 | −2.2704E+00 |
| S5 | 7.3623E−02 | 1.5799E−02 | −2.8130E−01 | 9.1916E−01 | −1.6366E+00 | 1.8822E+00 | −1.4579E+00 |
| S6 | 1.2290E−01 | −2.3627E−01 | 2.5407E+00 | −1.3340E+01 | 4.6879E+01 | −1.0540E+02 | 1.4725E+02 |
| S7 | 2.9234E−02 | −4.3772E−01 | 5.0566E+00 | −3.2240E+01 | 1.2829E+02 | −3.2272E+02 | 4.9810E+02 |
| S8 | −7.5814E−02 | 8.9106E−02 | −3.8444E−01 | 1.8376E+00 | −5.7767E+00 | 1.1239E+01 | −1.3275E+01 |
| S9 | −2.4886E−02 | 4.1760E−02 | −8.1272E−02 | 2.1322E−01 | −4.3290E−01 | 5.3013E−01 | −3.7855E−01 |
| 510 | 7.8370E−02 | −1.5102E+00 | 5.1158E+00 | −1.1423E+01 | 1.7355E+01 | −1.7794E+01 | 1.2165E+01 |
| S11 | 7.9502E−02 | −1.3309E+00 | 3.6392E+00 | −6.4115E+00 | 7.0283E+00 | −4.2924E+00 | 8.4933E−01 |
| S12 | −4.4198E−02 | −2.1521E−01 | 5.5980E−01 | −7.8664E−01 | 7.2116E−01 | −4.3977E−01 | 1.7678E−01 |
| S13 | −1.2496E−01 | 6.9039E−02 | −3.1879E−02 | 1.1962E−02 | −3.3621E−03 | 6.4268E−04 | −7.7672E−05 |
| S14 | 7.8683E−02 | 5.1996E−03 | −3.3633E−02 | 2.5963E−02 | −1.0109E−02 | 2.3230E−03 | −3.3013E−04 |
| S15 | 1.1470E−02 | −2.0932E−02 | 2.9742E−02 | −2.6989E−02 | 2.0178E−02 | −1.1767E−02 | 5.0024E−03 |
| S16 | 9.1301E−03 | −1.4976E−01 | 1.8560E−01 | −1.3696E−01 | 6.9361E−02 | −2.5030E−02 | 6.5269E−03 |

| surface number | A18 | A20 | A22 | A24 | A26 | A28 | A30 |
|---|---|---|---|---|---|---|---|
| S1 | −9.3500E−08 | 1.9204E−09 | 0.0000E+00 | 0.0000E+00 | 0.0000E+00 | 0.0000E+00 | 0.0000E+00 |
| S2 | 8.1069E−02 | −2.6364E−02 | 6.0692E−03 | −9.6322E−04 | 1.0003E−04 | −6.1064E−06 | 1.6580E−07 |
| S3 | 2.4102E−03 | −2.3402E−04 | 9.8730E−06 | 0.0000E+00 | 0.0000E+00 | 0.0000E+00 | 0.0000E+00 |
| S4 | 1.3368E+00 | −5.3163E−01 | 1.3514E−01 | −1.9745E−02 | 1.2582E−03 | 0.0000E+00 | 0.0000E+00 |
| S5 | 7.5994E−01 | −2.5379E−01 | 4.8113E−02 | −3.9075E−03 | 0.0000E+00 | 0.0000E+00 | 0.0000E+00 |
| S6 | −1.1537E+02 | 3.8322E+01 | 0.0000E+00 | 0.0000E+00 | 0.0000E+00 | 0.0000E+00 | 0.0000E+00 |
| S7 | −4.3080E+02 | 1.5998E+02 | 0.0000E+00 | 0.0000E+00 | 0.0000E+00 | 0.0000E+00 | 0.0000E+00 |
| S8 | 8.7173E+00 | −2.4482E+00 | 0.0000E+00 | 0.0000E+00 | 0.0000E+00 | 0.0000E+00 | 0.0000E+00 |
| S9 | 1.4505E−01 | −2.2872E−02 | 0.0000E+00 | 0.0000E+00 | 0.0000E+00 | 0.0000E+00 | 0.0000E+00 |
| S10 | −5.3880E+00 | 1.4561E+00 | −2.1310E−01 | 1.2769E−02 | 0.0000E+00 | 0.0000E+00 | 0.0000E+00 |
| S11 | 5.7482E−01 | −3.9015E−01 | 7.0672E−02 | 0.0000E+00 | 0.0000E+00 | 0.0000E+00 | 0.0000E+00 |
| S12 | −4.4907E−02 | 6.5109E−03 | −4.0917E−04 | 0.0000E+00 | 0.0000E+00 | 0.0000E+00 | 0.0000E+00 |
| S13 | 5.4223E−06 | −1.7981E−07 | 1.3636E−09 | 0.0000E+00 | 0.0000E+00 | 0.0000E+00 | 0.0000E+00 |
| S14 | 2.8669E−05 | −1.4018E−06 | 2.9734E−08 | 0.0000E+00 | 0.0000E+00 | 0.0000E+00 | 0.0000E+00 |
| S15 | −1.5097E−03 | 3.2077E−04 | −4.7525E−05 | 4.8007E−06 | −3.1501E−07 | 1.2102E−08 | −2.0654E−10 |
| S16 | −1.2359E−03 | 1.6947E−04 | −1.6622E−05 | 1.1350E−06 | −5.1180E−08 | 1.3690E−09 | −1.6439E−11 |

Figure 8A:
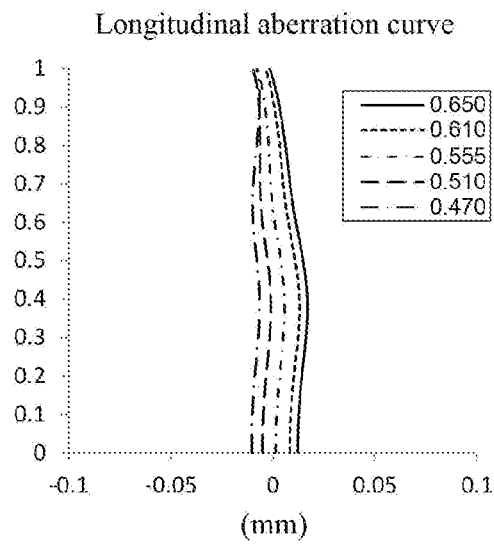
FIGS. 8a-8d respectively show a longitudinal aberration curve, an astigmatic curve, a distortion curve and a lateral color curve of the optical imaging lens group according to Embodiment 4 of the present disclosure.
Figure 8B:
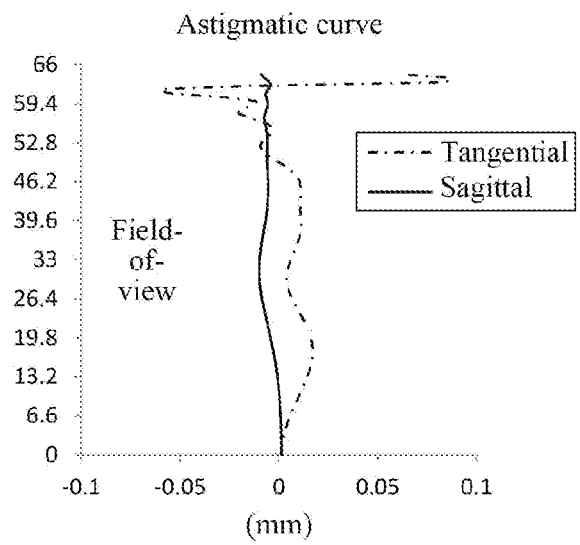
Figure 8C:
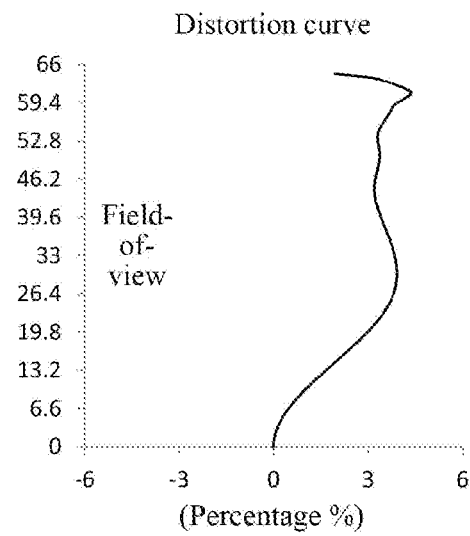
Figure 8D:
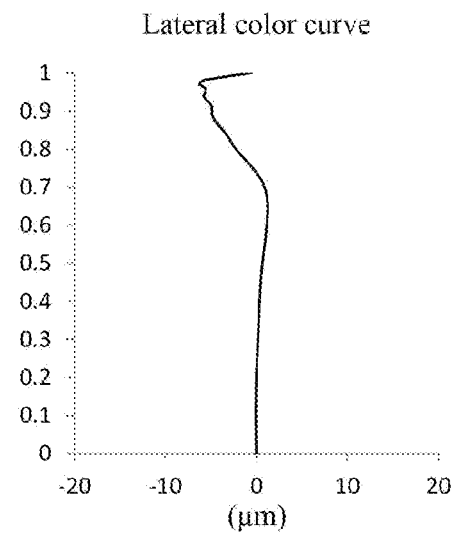

FIG. 8a illustrates a longitudinal aberration curve of the optical imaging lens group according to Embodiment 4, representing deviations of focal points of light of different wavelengths converged after passing through the lens assembly. FIG. 8b illustrates an astigmatic curve of the optical imaging lens group according to Embodiment 4, representing a curvature of a tangential image plane and a curvature of a sagittal image plane. FIG. 8c illustrates a distortion curve of the optical imaging lens group according to Embodiment 4, representing amounts of distortion corresponding to different image heights. FIG. 8d illustrates a lateral color curve of the optical imaging lens group according to Embodiment 4, representing deviations of different image heights on the image plane after light passes through the lens assembly. It can be seen from FIGS. 8a-8d that the optical imaging lens group given in Embodiment 4 can achieve a good imaging quality.

Embodiment 5

Figure 9:
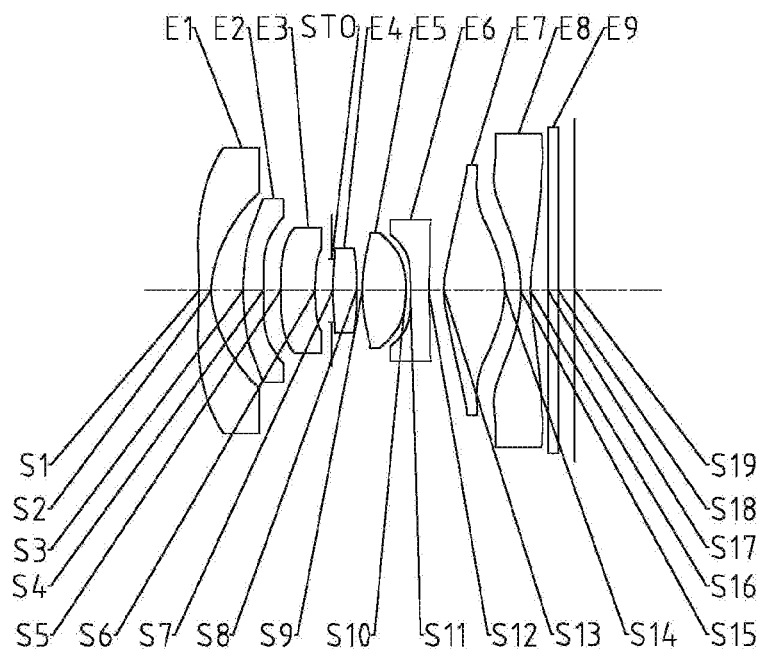
FIG. 9 is a schematic structural diagram of an optical imaging lens group according to Embodiment 5 of the present disclosure.

FIG. 9 is a schematic structural diagram of an optical imaging lens group according to Embodiment 5 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 13, Table 13 is a table showing basic parameters of the optical imaging lens group in Embodiment 5. Here, the units of a radius of curvature, a thickness and a focal length are millimeters (mm).

mm. The half of the maximal field-of-view of an optical imaging system is Semi-FOV=65.0°. The parameter in each relational expression is as explained in the Embodiment 1, and the value of the each relational expression is listed in the following table.

TABLE 14

| Embodiment 5 | | | |
|---|---|---|---|
| f(mm) | 1.63 | TTL(mm) | 7.67 |
| ImgH(mm) | 3.50 | Semi-FOV(°) | 65.0 |
| f/EPD | 2.00 | \|Dist.\|(%) | 5.04 |
| f8/(f8 − f7) | 0.55 | f456/f23 | 0.38 |
| R16/DT82 | 0.94 | ET5/CT5 | 0.23 |
| CT8/ET8 | 0.22 | ET1/SAG12 | 0.74 |
| SAG22/SAG21 | 0.99 | ET7/ET6 | 0.24 |
| f1/(R1 + R2) | 0.31 | (f5 − f6)/f4 | 0.86 |
| R3/(R5 + R6) | 0.19 | R14/(R14 − R13) | 0.44 |
| R9/(R9 − R10) | 0.59 | CT6/DT61 | 0.33 |
| (CT1 + CT2)/(CT3 + CT4) | 0.56 | CT7/ΣAT | 0.56 |

TABLE 13

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −9.9370 | 0.2475 | −2.59 | 1.55 | 56.1 | −0.1714 |
| S2 | aspheric | 1.6665 | 0.6506 | | | | −0.9678 |
| S3 | aspheric | 4.3177 | 0.4155 | 7.11 | 1.57 | 38.0 | −0.3402 |
| S4 | aspheric | −37.0003 | 0.3545 | | | | −99.0000 |
| S5 | aspheric | 15.0000 | 0.6996 | −28.01 | 1.67 | 20.4 | 35.8375 |
| S6 | aspheric | 8.1586 | 0.3417 | | | | −12.4449 |
| STO | spherical | infinite | 0.0250 | | | | |
| S7 | aspheric | 8.3188 | 0.4817 | 9.57 | 1.55 | 56.1 | 9.1231 |
| S8 | aspheric | −13.7600 | 0.1192 | | | | 2.0379 |
| S9 | aspheric | 3.5669 | 0.8910 | 2.85 | 1.55 | 56.1 | −0.4109 |
| S10 | aspheric | −2.5101 | 0.0910 | | | | 0.0220 |
| S11 | aspheric | −9.8462 | 0.3751 | −5.41 | 1.67 | 20.4 | 49.8821 |
| S12 | aspheric | 5.7686 | 0.3088 | | | | 3.0087 |
| S13 | aspheric | 2.0960 | 1.2426 | 1.93 | 1.55 | 56.1 | −0.9299 |
| S14 | aspheric | −1.6743 | 0.3207 | | | | −0.9696 |
| S15 | aspheric | −3.2128 | 0.2000 | −2.31 | 1.67 | 20.4 | −0.1924 |
| S16 | aspheric | 3.0264 | 0.3597 | | | | −0.6904 |
| S17 | spherical | infinite | 0.2100 | | 1.52 | 64.2 | |
| S18 | spherical | infinite | 0.3379 | | | | |
| S19 | spherical | infinite | | | | | |

As shown in Table 14, in Embodiment 5, the total effective focal length of the optical imaging lens group is f=1.63 mm, and the distance from the object-side surface S1 of first lens E1 to the image plane S19 on the optical axis is TTL=7.67 mm. The half of the diagonal length of the effective pixel area on the image plane S19 is ImgH=3.50

In Embodiment 5, the object-side surface and the image-side surface of any lens in the first to eighth lenses E1–E8 are both aspheric surfaces. Table 15 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1–S16 in Embodiment 5.

TABLE 15

| surface number | A4 | A6 | A8 | A10 | A12 | A14 | A16 |
|---|---|---|---|---|---|---|---|
| S1 | 3.8861E−02 | −1.1127E−02 | 3.4903E−03 | −1.0151E−03 | 2.2218E−04 | −3.2274E−05 | 2.8941E−06 |
| S2 | −1.2327E−01 | 2.7802E−01 | −7.1376E−01 | 1.3451E+00 | −1.7445E+00 | 1.5915E+00 | −1.0429E+00 |
| S3 | −1.0564E−01 | 1.5340E−01 | −1.2030E−01 | 9.8158E−02 | −7.6224E−02 | 4.1368E−02 | −1.4279E−02 |
| S4 | 7.2168E−02 | 8.3906E−02 | −1.7422E−01 | 4.4628E−01 | −8.6823E−01 | 1.1502E+00 | −1.0478E+00 |
| S5 | 1.0246E−01 | −1.0350E−01 | 1.7570E−01 | −9.6936E−02 | −2.3571E−01 | 6.5921E−01 | −8.1556E−01 |
| S6 | 1.2658E−01 | 4.6461E−04 | 1.2028E−01 | 5.2293E−01 | −3.3150E+00 | 8.4082E+00 | −1.0617E+01 |
| S7 | 3.6286E−02 | −2.1174E−01 | 2.9268E+00 | −2.4568E+01 | 1.2703E+02 | −4.0886E+02 | 7.9372E+02 |
| S8 | −6.9626E−02 | 7.7514E−02 | −2.4935E−01 | 6.1351E−01 | −1.3062E+00 | 2.6490E+00 | −4.1449E+00 |

TABLE 15-continued

| | | | | | | | |
|---|---|---|---|---|---|---|---|
| S9 | −1.8467E−02 | 1.4432E−02 | 1.1081E−02 | −6.1765E−02 | 4.4230E−02 | 8.6458E−02 | −1.9781E−01 |
| S10 | 4.1100E−02 | −1.0272E+00 | 2.3395E+00 | −2.2688E+00 | −1.9978E+00 | 1.0250E+01 | −1.6542E+01 |
| S11 | 7.2127E−02 | −1.1283E+00 | 2.0685E+00 | −1.3462E+00 | −2.3472E+00 | 6.8153E+00 | −7.8568E+00 |
| S12 | −9.8645E−03 | −3.7366E−01 | 8.8449E−01 | −1.1936E+00 | 1.0980E+00 | −7.0417E−01 | 3.0789E−01 |
| S13 | −1.0799E−01 | 3.7445E−02 | −1.0759E−02 | 1.2775E−03 | 2.1251E−03 | −1.5120E−03 | 4.4884E−04 |
| S14 | 1.4203E−01 | −1.1003E−01 | 6.1728E−02 | −3.1396E−02 | 1.4537E−02 | −4.6933E−03 | 9.3862E−04 |
| S15 | 2.1650E−02 | 4.5771E−02 | −2.3118E−01 | 3.5341E−01 | −3.0104E−01 | 1.6743E−01 | −6.4783E−02 |
| S16 | −7.1859E−02 | 3.0838E−02 | −5.1607E−02 | 5.8926E−02 | −3.6053E−02 | 1.3334E−02 | −3.1628E−03 |

| surface number | A18 | A20 | A22 | A24 | A26 | A28 | A30 |
|---|---|---|---|---|---|---|---|
| S1 | −1.4424E−07 | 3.0389E−09 | 0.0000E+00 | 0.0000E+00 | 0.0000E+00 | 0.0000E+00 | 0.0000E+00 |
| S2 | 4.9623E−01 | −1.7162E−01 | 4.2696E−02 | −7.4460E−03 | 8.6424E−04 | −5.9977E−05 | 1.8834E−06 |
| S3 | 3.0066E−03 | −3.5307E−04 | 1.7739E−05 | 0.0000E+00 | 0.0000E+00 | 0.0000E+00 | 0.0000E+00 |
| S4 | 6.4892E−01 | −2.6605E−01 | 6.8761E−02 | −1.0115E−02 | 6.4457E−04 | 0.0000E+00 | 0.0000E+00 |
| S5 | 5.9906E−01 | −2.6662E−01 | 6.6275E−02 | −7.0691E−03 | 0.0000E+00 | 0.0000E+00 | 0.0000E+00 |
| S6 | 6.6359E+00 | −1.7367E+00 | 0.0000E+00 | 0.0000E+00 | 0.0000E+00 | 0.0000E+00 | 0.0000E+00 |
| S7 | −8.4955E+02 | 3.8414E+02 | 0.0000E+00 | 0.0000E+00 | 0.0000E+00 | 0.0000E+00 | 0.0000E+00 |
| S8 | 3.8658E+00 | −1.5460E+00 | 0.0000E+00 | 0.0000E+00 | 0.0000E+00 | 0.0000E+00 | 0.0000E+00 |
| S9 | 1.5005E−01 | −4.0256E−02 | 0.0000E+00 | 0.0000E+00 | 0.0000E+00 | 0.0000E+00 | 0.0000E+00 |
| S10 | 1.5277E+01 | −8.5516E+00 | 2.7118E+00 | −3.7518E−01 | 0.0000E+00 | 0.0000E+00 | 0.0000E+00 |
| S11 | 4.9817E+00 | −1.6943E+00 | 2.4095E−01 | 0.0000E+00 | 0.0000E+00 | 0.0000E+00 | 0.0000E+00 |
| S12 | −8.6881E−02 | 1.4191E−02 | −1.0169E−03 | 0.0000E+00 | 0.0000E+00 | 0.0000E+00 | 0.0000E+00 |
| S13 | −6.9291E−05 | 5.4716E−06 | −1.7507E−07 | 0.0000E+00 | 0.0000E+00 | 0.0000E+00 | 0.0000E+00 |
| S14 | −1.1074E−04 | 7.0686E−06 | −1.8833E−07 | 0.0000E+00 | 0.0000E+00 | 0.0000E+00 | 0.0000E+00 |
| S15 | 1.7902E−02 | −3.5546E−03 | 5.0262E−04 | −4.9325E−05 | 3.1894E−06 | −1.2209E−07 | 2.0947E−09 |
| S16 | 4.8368E−04 | −4.4726E−05 | 1.8085E−06 | 7.9454E−08 | −1.3821E−08 | 6.7055E−10 | −1.1975E−11 |

Figures 10A, 10B:
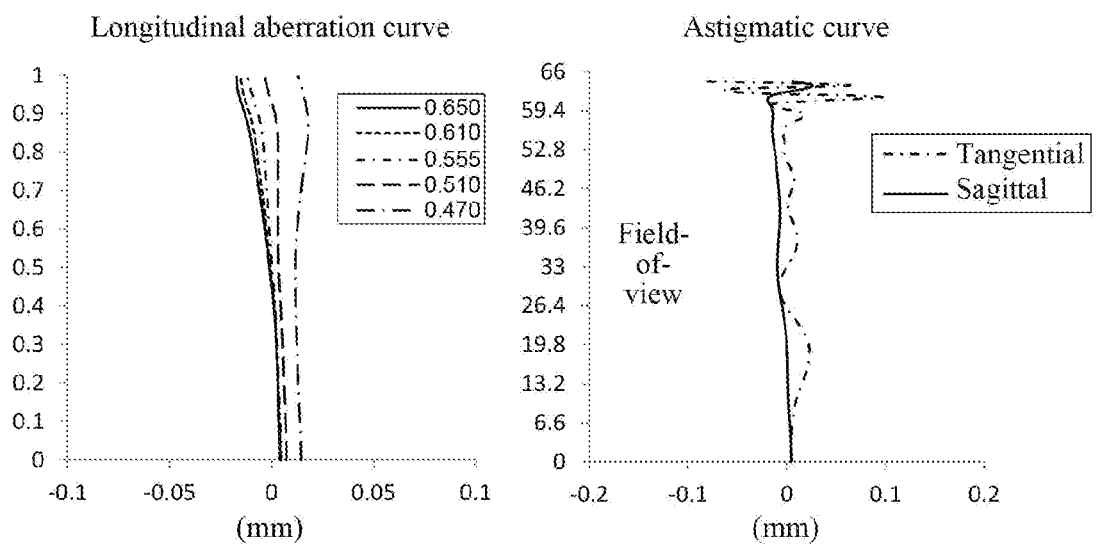
FIGS. 10a-10d respectively show a longitudinal aberration curve, an astigmatic curve, a distortion curve and a lateral color curve of the optical imaging lens group according to Embodiment 5 od the present disclosure.
Figure 10C:
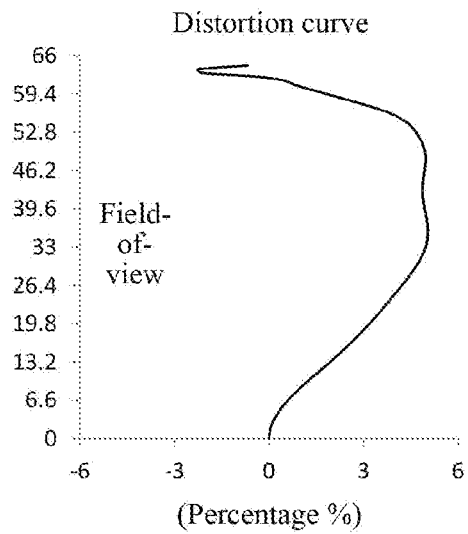
Figure 10D:
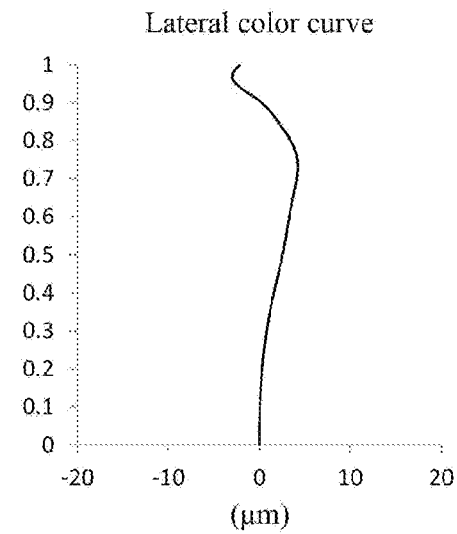

FIG. 10a illustrates a longitudinal aberration curve of the optical imaging lens group according to Embodiment 5, representing deviations of focal points of light of different wavelengths converged after passing through the lens assembly. FIG. 10b illustrates an astigmatic curve of the optical imaging lens group according to Embodiment 5, representing a curvature of a tangential image plane and a curvature of a sagittal image plane. FIG. 10c illustrates a distortion curve of the optical imaging lens group according to Embodiment 5, representing amounts of distortion corresponding to different image heights. FIG. 10d illustrates a lateral color curve of the optical imaging lens group according to Embodiment 5, representing deviations of different image heights on the image plane after light passes through the lens assembly. It can be seen from FIGS. 10a-10d that the optical imaging lens group given in Embodiment 5 can achieve a good imaging quality.

Embodiment 6

Figure 11:
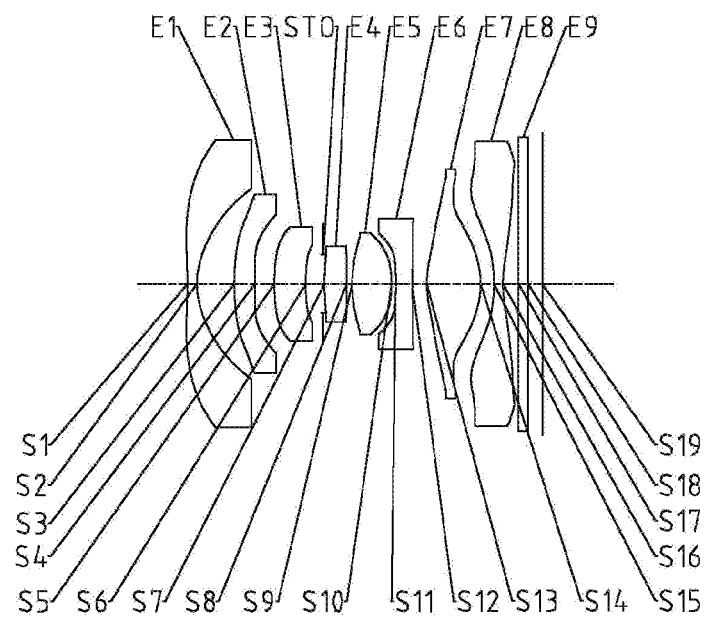
FIG. 11 is a schematic structural diagram of an optical imaging lens group according to Embodiment 6 of the present disclosure.

FIG. 11 is a schematic structural diagram of an optical imaging lens group according to Embodiment 6 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 16, Table 16 is a table showing basic parameters of the optical imaging lens group in Embodiment 6. Here, the units of a radius of curvature, a thickness and a focal length are millimeters (mm).

TABLE 16

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −9.4520 | 0.2093 | −2.56 | 1.55 | 56.1 | −0.6298 |
| S2 | aspheric | 1.6502 | 0.8269 | | | | −0.9035 |
| S3 | aspheric | 4.2130 | 0.4554 | 7.60 | 1.57 | 38.0 | −0.5250 |

TABLE 16-continued

| surface number | surface type | radius of curvature | thickness/ distance | focal length | refractive index | abbe number | conic coefficient |
|---|---|---|---|---|---|---|---|
| S4 | aspheric | −260.7858 | 0.4368 | | | | 50.0000 |
| S5 | aspheric | 7.8747 | 0.6935 | −142.55 | 1.67 | 20.4 | 28.9909 |
| S6 | aspheric | 7.0154 | 0.3895 | | | | −16.0749 |
| STO | spherical | infinite | 0.0257 | | | | |
| S7 | aspheric | 7.1609 | 0.4917 | 14.03 | 1.55 | 56.1 | 8.6934 |
| S8 | aspheric | 107.3372 | 0.1213 | | | | 50.0000 |
| S9 | aspheric | 2.9655 | 0.8703 | 2.65 | 1.55 | 56.1 | −0.7392 |
| S10 | aspheric | −2.5271 | 0.0972 | | | | −0.1692 |
| S11 | aspheric | −10.0459 | 0.3622 | −5.56 | 1.67 | 20.4 | 46.8444 |
| S12 | aspheric | 5.9457 | 0.3229 | | | | 2.9955 |
| S13 | aspheric | 2.1624 | 1.1946 | 1.94 | 1.55 | 56.1 | −0.8995 |
| S14 | aspheric | −1.6689 | 0.2931 | | | | −0.9722 |
| S15 | aspheric | −3.2579 | 0.2000 | −2.27 | 1.67 | 20.4 | −0.2289 |
| S16 | aspheric | 2.8953 | 0.3455 | | | | −0.7765 |
| S17 | spherical | infinite | 0.2100 | | 1.52 | 64.2 | |
| S18 | spherical | infinite | 0.3163 | | | | |
| S19 | spherical | infinite | | | | | |

As shown in Table 17, in Embodiment 6, the total effective focal length of the optical imaging lens group is f=1.55 mm, and the distance from the object-side surface S1 of first lens E1 to the image plane S19 on the optical axis is TTL=7.86 mm. The half of the diagonal length of the effective pixel area on the image plane S19 is ImgH=3.35 mm. The half of the maximal field-of-view of an optical imaging system is Semi-FOV=65.0°. The parameter in each relational expression is as explained in the Embodiment 1, and the value of the each relational expression is listed in the following table.

TABLE 17

Embodiment 6

| f(mm) | 1.55 | TTL(mm) | 7.86 |
|---|---|---|---|
| ImgH(mm) | 3.35 | Semi-FOV(°) | 65.0 |

TABLE 17-continued

Embodiment 6

| f/EPD | 2.00 | |Dist.|(%) | 5.07 |
|---|---|---|---|
| f8/(f8 − f7) | 0.54 | f456/f23 | 0.44 |
| R16/DT82 | 0.92 | ET5/CT5 | 0.27 |
| CT8/ET8 | 0.28 | ET1/SAG12 | 0.65 |
| SAG22/SAG21 | 1.04 | ET7/ET6 | 0.25 |
| f1/(R1 + R2) | 0.33 | (f5 − f6)/f4 | 0.58 |
| R3/(R5 + R6) | 0.28 | R14/(R14 − R13) | 0.44 |
| R9/(R9 − R10) | 0.54 | CT6/DT61 | 0.32 |
| (CT1 + CT2)/(CT3 + CT4) | 0.56 | CT7/ΣAT | 0.48 |

In Embodiment 6, the object-side surface and the image-side surface of any lens in the first to eighth lenses E1–E8 are both aspheric surfaces. Table 18 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1–S16 in Embodiment 6.

TABLE 18

| surface number | A4 | A6 | A8 | A10 | A12 | A14 | A16 |
|---|---|---|---|---|---|---|---|
| S1 | 3.5667E−02 | −9.0813E−03 | 2.4660E−03 | −6.4699E−04 | 1.3052E−04 | −1.7240E−05 | 1.3786E−06 |
| S2 | −8.7064E−02 | 1.0525E−01 | −1.8712E−01 | 3.2764E−01 | −4.2388E−01 | 3.9320E−01 | −2.6436E−01 |
| S3 | −1.0785E−01 | 1.4880E−01 | −8.0522E−02 | 1.9317E−02 | 2.4361E−03 | −4.5681E−03 | 2.0717E−03 |
| S4 | 3.8506E−02 | 1.7833E−01 | −3.1882E−01 | 6.3372E−01 | −1.0987E+00 | 1.4095E+00 | −1.2781E+00 |
| S5 | 9.5715E−02 | −3.4831E−03 | −1.4758E−01 | 5.6007E−01 | −1.1335E+00 | 1.4251E+00 | −1.1245E+00 |
| S6 | 1.3955E−01 | −9.5506E−02 | 7.8788E−01 | −3.3214E+00 | 1.0802E+01 | −2.4462E+01 | 3.5850E+01 |
| S7 | 5.3352E−02 | −6.4337E−01 | 8.4965E+00 | −6.5597E+01 | 3.1125E+02 | −9.2543E+02 | 1.6799E+03 |
| S8 | −5.1246E−02 | −8.8222E−02 | 1.0759E+00 | −5.8711E+00 | 1.8925E+01 | −3.7968E+01 | 4.6425E+01 |
| S9 | −1.7302E−02 | −1.2638E−02 | 1.6389E−01 | −5.0218E−01 | 8.1580E−01 | −7.8454E−01 | 4.2443E−01 |
| S10 | 9.0782E−02 | −1.5832E+00 | 4.8481E+00 | −7.6106E+00 | 2.8058E+00 | 1.2642E+01 | −2.7784E+01 |
| S11 | 1.3166E−01 | −1.9479E+00 | 5.5847E+00 | −9.4016E+00 | 9.1621E+00 | −4.2619E+00 | −5.0776E−01 |
| S12 | 2.5752E−01 | −7.1793E−01 | 1.9645E+00 | −2.9885E+00 | 2.9354E+00 | −1.9348E+00 | 8.5317E−01 |
| S13 | −8.7362E−02 | −4.6491E−02 | 9.4836E−02 | −6.7701E−02 | 2.9361E−02 | −8.4158E−03 | 1.5866E−03 |
| S14 | 1.5936E−01 | −1.9277E−01 | 1.2936E−01 | −5.5871E−02 | 1.8597E−02 | −4.7131E−03 | 8.2631E−04 |
| S15 | 1.2722E−01 | −4.5649E−01 | 6.8288E−01 | −6.2123E−01 | 3.8981E−01 | −1.7623E−01 | 5.8320E−02 |
| S16 | 2.3955E−02 | −3.3173E−01 | 5.1837E−01 | −4.5185E−01 | 2.5914E−01 | −1.0389E−01 | 2.9934E−02 |

| surface number | A18 | A20 | A22 | A24 | A26 | A28 | A30 |
|---|---|---|---|---|---|---|---|
| S1 | −6.0333E−08 | 1.1044E−09 | 0.0000E+00 | 0.0000E+00 | 0.0000E+00 | 0.0000E+00 | 0.0000E+00 |
| S2 | 1.2971E−01 | −4.6388E−02 | 1.1951E−02 | −2.1592E−03 | 2.5945E−04 | −1.8602E−05 | 6.0146E−07 |
| S3 | −4.8445E−04 | 5.8069E−05 | −2.8091E−06 | 0.0000E+00 | 0.0000E+00 | 0.0000E+00 | 0.0000E+00 |
| S4 | 7.9405E−01 | −3.2880E−01 | 8.7008E−02 | −1.3405E−02 | 9.2207E−04 | 0.0000E+00 | 0.0000E+00 |
| S5 | 5.1745E−01 | −1.0249E−01 | −9.6760E−03 | 5.4877E−03 | 0.0000E+00 | 0.0000E+00 | 0.0000E+00 |
| S6 | −2.9659E+01 | 1.0295E+01 | 0.0000E+00 | 0.0000E+00 | 0.0000E+00 | 0.0000E+00 | 0.0000E+00 |
| S7 | −1.7032E+03 | 7.3903E+02 | 0.0000E+00 | 0.0000E+00 | 0.0000E+00 | 0.0000E+00 | 0.0000E+00 |
| S8 | −3.1575E+01 | 9.1342E+00 | 0.0000E+00 | 0.0000E+00 | 0.0000E+00 | 0.0000E+00 | 0.0000E+00 |
| S9 | −1.1110E−01 | 9.5946E−03 | 0.0000E+00 | 0.0000E+00 | 0.0000E+00 | 0.0000E+00 | 0.0000E+00 |
| S10 | 2.8496E+01 | −1.6639E+01 | 5.3274E+00 | −7.2865E−01 | 0.0000E+00 | 0.0000E+00 | 0.0000E+00 |

TABLE 18-continued

| | | | | | | | |
|---|---|---|---|---|---|---|---|
| S11 | 1.7426E+00 | −8.4709E−01 | 1.4252E−01 | 0.0000E+00 | 0.0000E+00 | 0.0000E+00 | 0.0000E+00 |
| S12 | −2.4144E−01 | 3.9588E−02 | −2.8554E−03 | 0.0000E+00 | 0.0000E+00 | 0.0000E+00 | 0.0000E+00 |
| S13 | −1.8759E−04 | 1.2531E−05 | −3.5940E−07 | 0.0000E+00 | 0.0000E+00 | 0.0000E+00 | 0.0000E+00 |
| S14 | −9.1189E−05 | 5.6268E−06 | −1.4731E−07 | 0.0000E+00 | 0.0000E+00 | 0.0000E+00 | 0.0000E+00 |
| S15 | −1.4171E−02 | 2.5150E−03 | −3.2124E−04 | 2.8690E−05 | −1.6979E−06 | 5.9748E−08 | −9.4566E−10 |
| S16 | −6.2717E−03 | 9.5524E−04 | −1.0450E−04 | 7.9869E−06 | −4.0425E−07 | 1.2159E−08 | −1.6437E−10 |

Figure 12A:
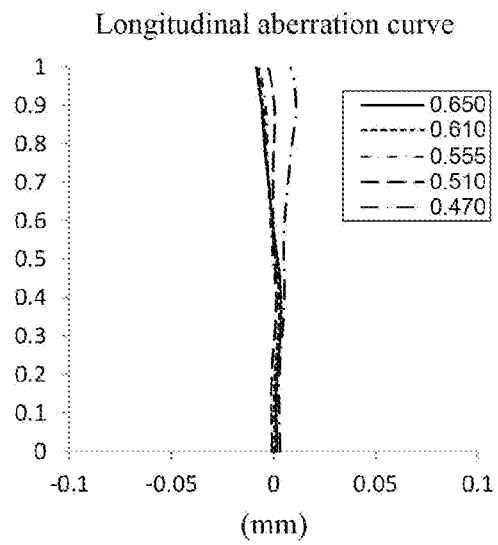
FIGS. 12a-12d respectively show a longitudinal aberration curve, an astigmatic curve, a distortion curve and a lateral color curve of the optical imaging lens group according to Embodiment 6 of the present disclosure.
Figure 12B:
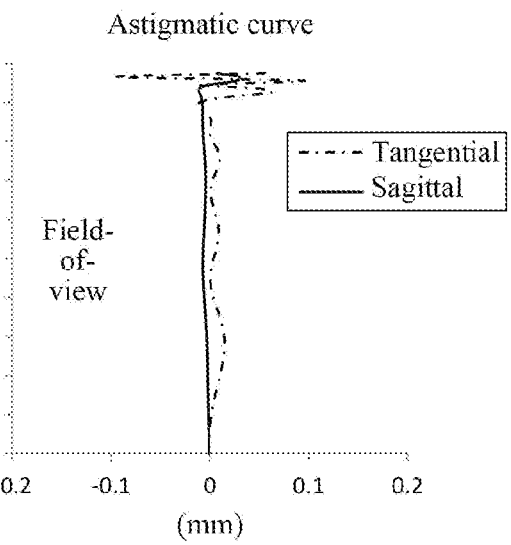
Figure 12C:
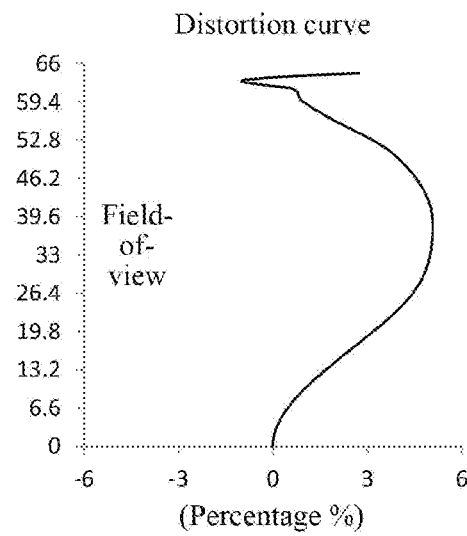
Figure 12D:
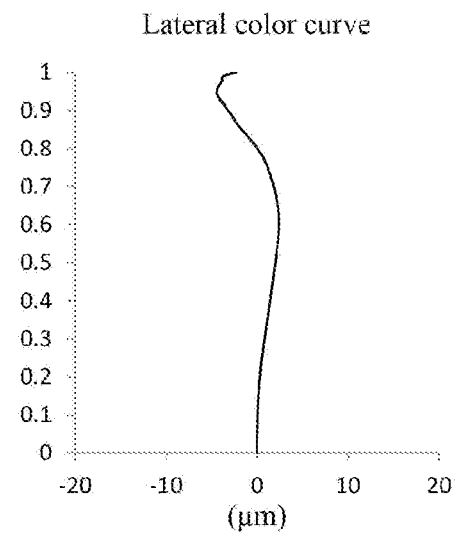

FIG. 12a illustrates a longitudinal aberration curve of the optical imaging lens group according to Embodiment 6, representing deviations of focal points of light of different wavelengths converged after passing through the lens assembly. FIG. 12b illustrates an astigmatic curve of the optical imaging lens group according to Embodiment 6, representing a curvature of a tangential image plane and a curvature of a sagittal image plane. FIG. 12c illustrates a distortion curve of the optical imaging lens group according to Embodiment 6, representing amounts of distortion corresponding to different image heights. FIG. 12d illustrates a lateral color curve of the optical imaging lens group according to Embodiment 6, representing deviations of different image heights on the image plane after light passes through the lens assembly. It can be seen from FIGS. 12a-12d that the optical imaging lens group given in Embodiment 6 can achieve a good imaging quality.

Embodiment 7

Figure 13:
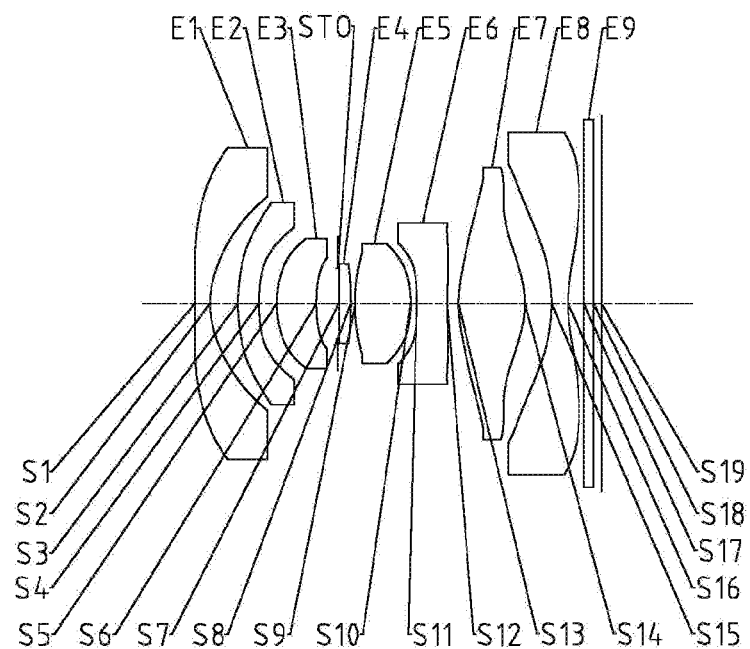
FIG. 13 is a schematic structural diagram of an optical imaging lens group according to Embodiment 7 of the present disclosure.

FIG. 13 is a schematic structural diagram of an optical imaging lens group according to Embodiment 7 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 19, Table 19 is a table showing basic parameters of the optical imaging lens group in Embodiment 7. Here, the units of a radius of curvature, a thickness and a focal length are millimeters (mm).

TABLE 19

| surface number | surface type | radius of curvature | thickness/ distance | focal length | refractive index | abbe number | conic coefficient |
|---|---|---|---|---|---|---|---|
| OBJ | spherical | infinite | infinite | | | | |
| S1 | aspheric | −27.4097 | 0.3145 | −3.24 | 1.55 | 56.1 | 0.0000 |
| S2 | aspheric | 1.8974 | 0.5928 | | | | −1.0000 |
| S3 | aspheric | 3.7801 | 0.4437 | 41.59 | 1.57 | 38.0 | 0.0000 |
| S4 | aspheric | 4.3048 | 0.3791 | | | | 0.0000 |
| S5 | aspheric | 2.4118 | 0.8395 | 8.25 | 1.65 | 23.5 | 0.0000 |
| S6 | aspheric | 3.8123 | 0.4525 | | | | 0.0000 |
| STO | spherical | infinite | 0.0250 | | | | |
| S7 | aspheric | −4323.4479 | 0.2521 | 16.92 | 1.55 | 56.1 | 0.0000 |
| S8 | aspheric | −9.2199 | 0.0899 | | | | 0.0000 |
| S9 | aspheric | 3.9371 | 1.1788 | 3.12 | 1.55 | 56.1 | 0.0000 |
| S10 | aspheric | −2.6847 | 0.1286 | | | | 0.0000 |
| S11 | aspheric | −7.6431 | 0.6492 | −5.80 | 1.67 | 20.4 | 0.0000 |
| S12 | aspheric | 8.0942 | 0.2373 | | | | 0.0000 |
| S13 | aspheric | 2.8407 | 1.4060 | 2.41 | 1.55 | 56.1 | −1.0000 |
| S14 | aspheric | −2.0270 | 0.5654 | | | | −1.0000 |
| S15 | aspheric | −3.5047 | 0.3485 | −2.68 | 1.65 | 23.5 | 0.0000 |
| S16 | aspheric | 3.5311 | 0.3300 | | | | −1.0000 |
| S17 | spherical | infinite | 0.2100 | | 1.52 | 64.2 | |
| S18 | spherical | infinite | 0.1696 | | | | |
| S19 | spherical | infinite | | | | | |

As shown in Table 20, in Embodiment 7, the total effective focal length of the optical imaging lens group is f=2.13 mm, and the distance from the object-side surface S1 of first lens E1 to the image plane S19 on the optical axis is TTL=8.61 mm. The half of the diagonal length of the effective pixel area on the image plane S19 is ImgH=4.00 mm. The half of the maximal field-of-view of an optical imaging system is Semi-FOV=61.5°. The parameter in each relational expression is as explained in the Embodiment 1, and the value of the each relational expression is listed in the following table.

TABLE 20

Embodiment 7

| f(mm) | 2.13 | TTL(mm) | 8.61 |
|---|---|---|---|
| ImgH(mm) | 4.00 | Semi-FOV(°) | 61.5 |
| f/EPD | 2.00 | |Dist.|(%) | 5.01 |
| f8/(f8 − f7) | 0.53 | f456/f23 | 0.58 |
| R16/DT82 | 0.97 | ET5/CT5 | 0.45 |
| CT8/ET8 | 0.30 | ET1/SAG12 | 0.69 |
| SAG22/SAG21 | 1.06 | ET7/ET6 | 0.35 |
| f1/(R1 + R2) | 0.13 | (f5 − f6)/f4 | 0.53 |
| R3/(R5 + R6) | 0.61 | R14/(R14 − R13) | 0.42 |
| R9/(R9 − R10) | 0.59 | CT6/DT61 | 0.50 |
| (CT1 + CT2)/(CT3 + CT4) | 0.69 | CT7/ΣAT | 0.57 |

In Embodiment 7, the object-side surface and the image-side surface of any lens in the first to eighth lenses E1–E8 are both aspheric surfaces. Table 21 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$ and $A_{28}$ applicable to the aspheric surfaces S1–S16 in Embodiment 7.

TABLE 21

| surface number | A4 | A6 | A8 | A10 | A12 | A14 | A16 |
|---|---|---|---|---|---|---|---|
| S1 | 1.7400E−02 | −1.4607E−03 | −1.5678E−04 | 5.8364E−05 | −6.4468E−06 | 3.3907E−07 | −6.9459E−09 |
| S2 | −4.3124E−02 | 1.4210E−02 | 2.7658E−03 | −3.1735E−03 | 8.7643E−04 | −1.2468E−04 | 2.2551E−05 |
| S3 | −4.0380E−02 | 4.0492E−02 | −1.2240E−02 | 9.1510E−04 | 1.6391E−04 | −2.6261E−05 | 4.6408E−07 |
| S4 | 4.9492E−02 | 4.1723E−02 | −4.2455E−02 | 3.2509E−02 | −1.2145E−02 | −1.7160E−03 | 2.9026E−03 |
| S5 | 3.8832E−02 | −5.6491E−03 | −2.1114E−03 | 1.9529E−02 | −1.2417E−02 | −4.8675E−03 | 1.0637E−02 |
| S6 | 6.5547E−02 | −3.6191E−02 | 3.2088E−01 | −7.7151E−01 | 1.0831E+00 | −6.7510E−01 | 8.7068E−02 |
| S7 | 7.3012E−03 | −8.7321E−03 | 6.2347E−02 | −1.3386E−01 | 1.5573E−01 | −9.8631E−02 | 2.5662E−02 |
| S8 | −3.4016E−02 | 3.8471E−03 | 4.1673E−02 | −9.5458E−02 | 1.0125E−01 | −5.4714E−02 | 1.1250E−02 |
| S9 | −1.0965E−02 | 6.3053E−03 | 2.8509E−03 | −8.8392E−03 | 6.8446E−03 | −2.5189E−03 | 3.6717E−04 |
| S10 | −1.4250E−02 | −2.2339E−01 | 3.0837E−01 | −2.2765E−01 | 9.7557E−02 | −1.9411E−02 | −9.8990E−04 |
| S11 | −2.1771E−02 | −2.1501E−01 | 2.2907E−01 | −1.3235E−01 | 4.1902E−02 | −5.2042E−03 | −2.2048E−04 |
| S12 | −3.5272E−02 | −2.9301E−02 | 3.7933E−02 | −1.9061E−02 | 5.4415E−03 | −8.3927E−04 | 5.3334E−05 |
| S13 | −5.9543E−02 | 2.0784E−02 | −4.6474E−03 | 6.4870E−04 | −7.2311E−06 | −5.4033E−08 | |
| S14 | 5.8591E−02 | −1.7506E−02 | 6.1680E−03 | −1.3112E−03 | 1.5035E−04 | −8.7048E−06 | 1.8485E−07 |
| S15 | 5.0568E−03 | −1.9064E−03 | 1.3256E−03 | −3.1442E−04 | 5.0474E−05 | −6.5313E−06 | 6.0548E−07 |
| S16 | −3.5821E−02 | 4.8837E−03 | −3.5922E−04 | 9.5950E−06 | 1.3724E−07 | −9.5738E−09 | 7.2667E−11 |

| surface number | A18 | A20 | A22 | A24 | A26 | A28 |
|---|---|---|---|---|---|---|
| S1 | −2.6861E−11 | −5.7499E−13 | 0.0000E+00 | 0.0000E+00 | 0.0000E+00 | 0.0000E+00 |
| S2 | −7.2338E−06 | 1.8241E−06 | −3.1325E−07 | 3.5398E−08 | −2.3686E−09 | 7.2037E−11 |
| S3 | 7.0161E−08 | −4.7991E−09 | 2.4210E−10 | 0.0000E+00 | 0.0000E+00 | 0.0000E+00 |
| S4 | −1.0071E−03 | 1.7679E−04 | −1.4422E−05 | 0.0000E+00 | 0.0000E+00 | 0.0000E+00 |
| S5 | −5.8190E−03 | 1.5385E−03 | −1.9724E−04 | 0.0000E+00 | 0.0000E+00 | 0.0000E+00 |
| S6 | 4.7660E−02 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 1.3555E−03 | −3.3535E−04 | 4.6741E−05 | 0.0000E+00 | 0.0000E+00 | 0.0000E+00 |
| S11 | 8.3286E−05 | −1.4804E−05 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 | 0.0000E+00 |
| S13 | −1.4611E−10 | −1.6934E−12 | 0.0000E+00 | 0.0000E+00 | 0.0000E+00 | 0.0000E+00 |
| S14 | 7.5926E−10 | 3.4761E−11 | 0.0000E+00 | 0.0000E+00 | 0.0000E+00 | 0.0000E+00 |
| S15 | −3.2766E−08 | 7.6242E−10 | 0.0000E+00 | 0.0000E+00 | 0.0000E+00 | 0.0000E+00 |
| S16 | 1.8471E−14 | 0.0000E+00 | 0.0000E+00 | 0.0000E+00 | 0.0000E+00 | 0.0000E+00 |

Figures 14A, 14B:
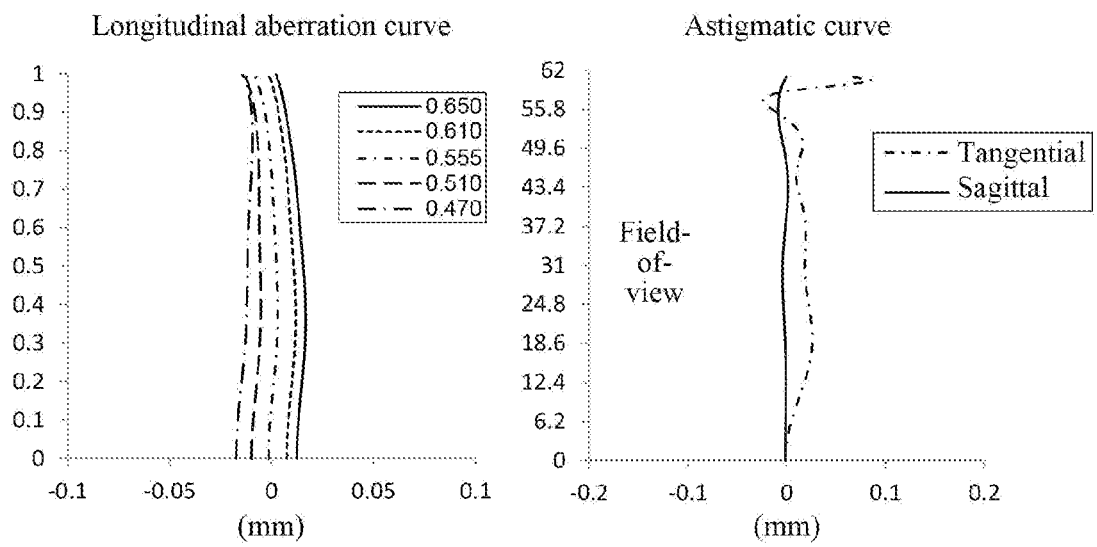
FIGS. 14a-14d respectively show a longitudinal aberration curve, an astigmatic curve, a distortion curve and a lateral color curve of the optical imaging lens group according to Embodiment 7 of the present disclosure.
Figure 14C:
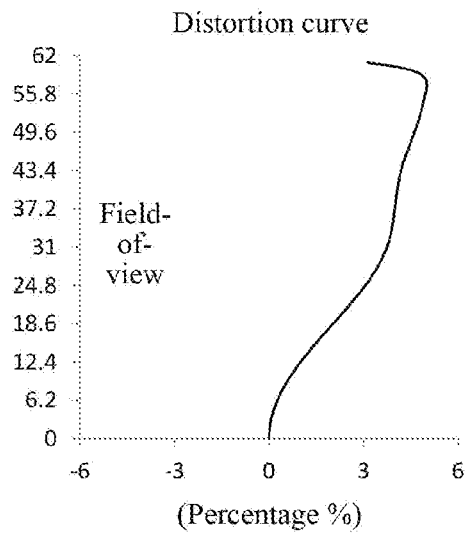
Figure 14D:
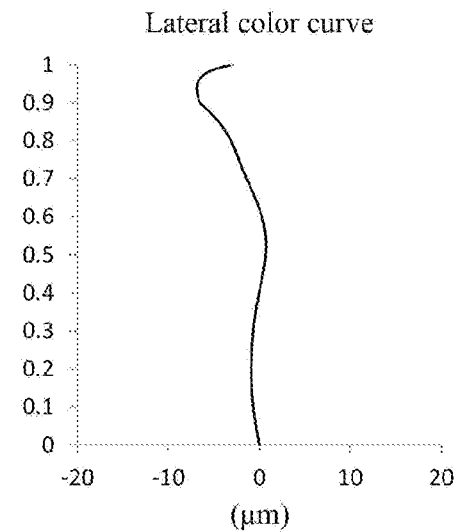

FIG. 14a illustrates a longitudinal aberration curve of the optical imaging lens group according to Embodiment 7, representing deviations of focal points of light of different wavelengths converged after passing through the lens assembly. FIG. 14b illustrates an astigmatic curve of the optical imaging lens group according to Embodiment 7, representing a curvature of a tangential image plane and a curvature of a sagittal image plane. FIG. 14c illustrates a distortion curve of the optical imaging lens group according to Embodiment 7, representing amounts of distortion corresponding to different image heights. FIG. 14d illustrates a lateral color curve of the optical imaging lens group according to Embodiment 7, representing deviations of different image heights on the image plane after light passes through the lens assembly. It can be seen from FIGS. 14a-14d that the optical imaging lens group given in Embodiment 7 can achieve a good imaging quality.

Embodiment 8

Figure 15:
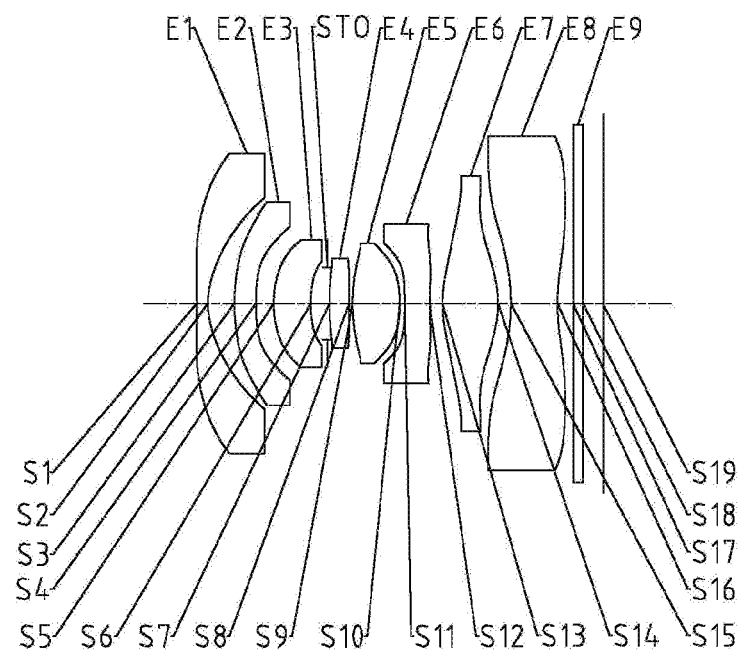
FIG. 15 is a schematic structural diagram of an optical imaging lens group according to Embodiment 8 of the present disclosure.

FIG. 15 is a schematic structural diagram of an optical imaging lens group according to Embodiment 8 of the present disclosure. The optical imaging lens group includes, sequentially along an optical axis from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S15 of the eighth lens E8 is a convex surface, and an image-side surface S16 of the eighth lens E8 is a concave surface. The optical filter E9 has an object-side surface S17 and an image-side surface S18. Light from an object sequentially passes through the surfaces S1–S18 and finally forms an image on the image plane S19.

As shown in Table 22, Table 22 is a table showing basic parameters of the optical imaging lens group in Embodiment 8. Here, the units of a radius of curvature, a thickness and a focal length are millimeters (mm).

TABLE 22

| surface number | surface type | radius of curvature | thickness/ distance | focal length | refractive index | abbe number | conic coefficient |
| --- | --- | --- | --- | --- | --- | --- | --- |
| OBJ | spherical | infinite | infinite | | | | |
| S1 | aspheric | −15.2271 | 0.2350 | −2.85 | 1.55 | 56.1 | 0.0000 |
| S2 | aspheric | 1.7449 | 0.5570 | | | | −1.0000 |
| S3 | aspheric | 3.7281 | 0.4561 | 17.46 | 1.57 | 38.0 | 0.0000 |
| S4 | aspheric | 5.8575 | 0.3762 | | | | 0.0000 |
| S5 | aspheric | 2.4796 | 0.7830 | 14.17 | 1.67 | 20.4 | 0.0000 |
| S6 | aspheric | 2.9388 | 0.3512 | | | | 0.0000 |
| STO | spherical | infinite | 0.0428 | | | | |
| S7 | aspheric | 6.5059 | 0.4124 | 13.41 | 1.55 | 56.1 | 0.0000 |
| S8 | aspheric | 57.0064 | 0.0793 | | | | 0.0000 |
| S9 | aspheric | 3.9241 | 0.9897 | 3.29 | 1.55 | 56.1 | 0.0000 |
| S10 | aspheric | −3.0100 | 0.1084 | | | | 0.0000 |
| S11 | aspheric | −10.8650 | 0.5253 | −7.58 | 1.67 | 20.4 | 0.0000 |
| S12 | aspheric | 9.5972 | 0.2723 | | | | 0.0000 |
| S13 | aspheric | 2.5508 | 1.1729 | 2.38 | 1.55 | 56.1 | −1.0000 |
| S14 | aspheric | −2.2127 | 0.2694 | | | | −1.0000 |
| S15 | aspheric | −4.3868 | 0.9851 | −3.11 | 1.67 | 20.4 | 0.0000 |
| S16 | aspheric | 4.2804 | 0.3300 | | | | 0.0000 |
| S17 | spherical | infinite | 0.2100 | | 1.52 | 64.2 | |
| S18 | spherical | infinite | 0.4213 | | | | |
| S19 | spherical | infinite | | | | | |

As shown in Table 23, in Embodiment 8, the total effective focal length of the optical imaging lens group is f=2.10 mm, and the distance from the object-side surface S1 of first lens E1 to the image plane S19 on the optical axis is TTL=8.58 mm. The half of the diagonal length of the effective pixel area on the image plane S19 is ImgH=4.00 mm. The half of the maximal field-of-view of an optical imaging system is Semi-FOV=61.5°. The parameter in each relational expression is as explained in the Embodiment 1, and the value of the each relational expression is listed in the following table.

TABLE 23

| Embodiment 8 | | | |
| --- | --- | --- | --- |
| f(mm) | 2.10 | TTL(mm) | 8.58 |
| ImgH(mm) | 4.00 | Semi-FOV(°) | 61.5 |
| f/EPD | 2.00 | \|Dist.\|(%) | 5.10 |
| f8/(f8 − f7) | 0.57 | f456/f23 | 0.49 |
| R16/DT82 | 1.21 | ET5/CT5 | 0.30 |
| CT8/ET8 | 0.70 | ET1/SAG12 | 0.62 |
| SAG22/SAG21 | 1.03 | ET7/ET6 | 0.43 |
| f1/(R1 + R2) | 0.21 | (f5 − f6)/f4 | 0.81 |
| R3/(R5 + R6) | 0.69 | R14/(R14 − R13) | 0.46 |
| R9/(R9 − R10) | 0.57 | CT6/DT61 | 0.41 |
| (CT1 + CT2)/(CT3 + CT4) | 0.58 | CT7/ΣAT | 0.57 |

In Embodiment 8, the object-side surface and the image-side surface of any lens in the first to eighth lenses E1–E8 are both aspheric surfaces. Table 24 shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$ and $A_{28}$ applicable to the aspheric surfaces S1–S16 in Embodiment 8.

TABLE 24

| surface number | A4 | A6 | A8 | A10 | A12 | A14 | A16 |
| --- | --- | --- | --- | --- | --- | --- | --- |
| S1 | 2.8585E−02 | −4.5258E−03 | 3.5585E−04 | 8.9215E−06 | −4.0483E−06 | 3.1955E−07 | −8.8496E−09 |
| S2 | −5.7766E−02 | 2.2156E−02 | 5.2929E−04 | −3.0861E−03 | 9.6179E−04 | −1.3988E−04 | 2.3214E−05 |
| S3 | −6.1622E−02 | 6.2201E−02 | −2.3232E−02 | 3.9404E−03 | −2.9759E−04 | 8.9964E−06 | −1.7651E−07 |
| S4 | 6.7556E−02 | 5.4627E−02 | −6.4485E−02 | 4.9475E−02 | −2.2928E−02 | 3.2317E−03 | 1.2530E−03 |

TABLE 24-continued

| | | | | | | | |
|---|---|---|---|---|---|---|---|
| S5 | 5.5519E-02 | -2.2396E-02 | 7.7265E-03 | 1.8663E-02 | -1.9780E-02 | 5.3696E-03 | 3.6849E-03 |
| S6 | 8.9816E-02 | -6.9565E-02 | 5.5963E-01 | -1.4432E+00 | 2.2473E+00 | -1.5476E+00 | 2.4331E-01 |
| S7 | 4.6647E-03 | 3.1781E-02 | -2.8524E-02 | 6.0638E-03 | 7.5200E-02 | -1.6132E-01 | 8.8698E-02 |
| S8 | -5.5340E-02 | 2.8652E-02 | 4.4717E-03 | -5.8840E-02 | 5.9357E-02 | -1.4968E-02 | -7.6180E-03 |
| S9 | -2.1010E-02 | 2.9075E-02 | -2.3623E-02 | 5.3295E-03 | 5.9390E-03 | -5.7784E-03 | 1.5599E-03 |
| S10 | 9.3393E-03 | -5.4270E-01 | 9.0929E-01 | -8.2725E-01 | 4.3680E-01 | -1.0843E-01 | -4.6927E-03 |
| S11 | 1.5089E-02 | -5.0464E-01 | 6.6446E-01 | -4.8086E-01 | 1.9252E-01 | -3.3536E-02 | 3.8207E-04 |
| S12 | -4.2707E-02 | -6.3723E-02 | 9.2622E-02 | -5.5107E-02 | 1.8607E-02 | -3.3918E-03 | 2.5497E-04 |
| S13 | -8.1064E-02 | 3.0981E-02 | -7.8570E-03 | 1.2525E-03 | -1.2395E-04 | 6.9230E-06 | -1.5979E-07 |
| S14 | 5.7709E-02 | -1.8088E-02 | 6.4985E-03 | -1.4035E-03 | 1.6426E-04 | -9.7778E-06 | 2.1815E-07 |
| S15 | 5.4862E-03 | -1.6386E-03 | 1.0559E-03 | -1.9160E-04 | 1.5947E-05 | -6.7974E-07 | 1.9082E-08 |
| S16 | -3.3708E-02 | 3.9799E-03 | -8.6063E-05 | -4.9270E-05 | 7.7682E-06 | -5.8258E-07 | 2.2930E-08 |

| surface number | A18 | A20 | A22 | A24 | A26 | A28 |
|---|---|---|---|---|---|---|
| S1 | -3.6593E-11 | -5.7826E-13 | 0.0000E+00 | 0.0000E+00 | 0.0000E+00 | 0.0000E+00 |
| S2 | -7.3259E-06 | 1.8708E-06 | -3.2464E-07 | 3.7139E-08 | -2.5176E-09 | 7.7816E-11 |
| S3 | 1.3793E-09 | 2.8904E-10 | -1.3748E-10 | 0.0000E+00 | 0.0000E+00 | 0.0000E+00 |
| S4 | -5.8014E-04 | 1.0656E-04 | -9.9132E-06 | 0.0000E+00 | 0.0000E+00 | 0.0000E+00 |
| S5 | -2.9306E-03 | 7.9719E-04 | -1.1788E-04 | 0.0000E+00 | 0.0000E+00 | 0.0000E+00 |
| S6 | 1.0700E-01 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 9.9724E-03 | -2.9911E-03 | 5.1671E-04 | 0.0000E+00 | 0.0000E+00 | 0.0000E+00 |
| S11 | 2.6618E-04 | -5.2551E-05 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 | 0.0000E+00 |
| S13 | -3.5772E-10 | -4.1019E-12 | 0.0000E+00 | 0.0000E+00 | 0.0000E+00 | 0.0000E+00 |
| S14 | 9.4942E-10 | 1.6797E-11 | 0.0000E+00 | 0.0000E+00 | 0.0000E+00 | 0.0000E+00 |
| S15 | -7.0405E-10 | 1.9603E-11 | 0.0000E+00 | 0.0000E+00 | 0.0000E+00 | 0.0000E+00 |
| S16 | -3.7723E-10 | 0.0000E+00 | 0.0000E+00 | 0.0000E+00 | 0.0000E+00 | 0.0000E+00 |

Figure 16A:
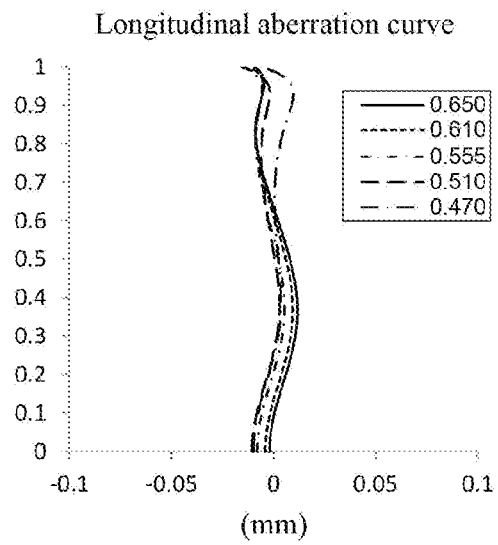
FIGS. 16a-16d respectively show a longitudinal aberration curve, an astigmatic curve, a distortion curve and a lateral color curve of the optical imaging lens group according to Embodiment 8 of the present disclosure.
Figure 16B:
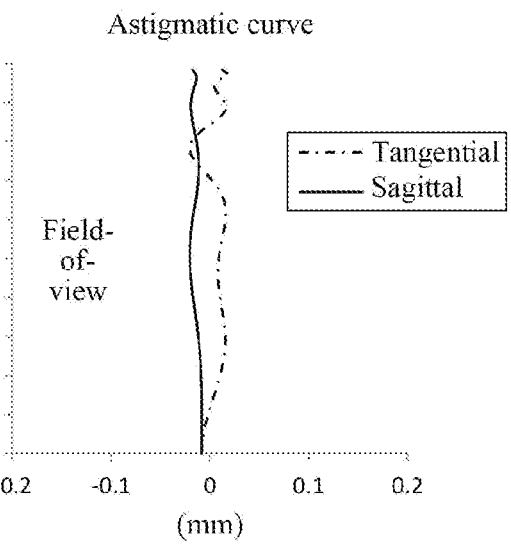
Figure 16C:
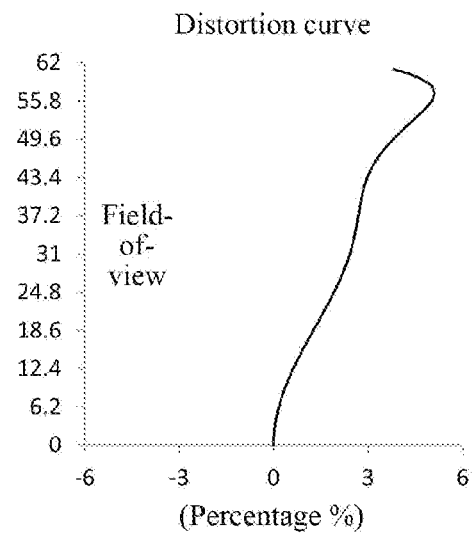
Figure 16D:
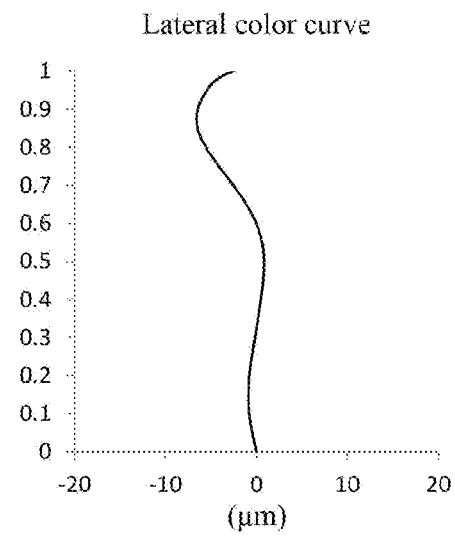

FIG. 16a illustrates a longitudinal aberration curve of the optical imaging lens group according to Embodiment 8, representing deviations of focal points of light of different wavelengths converged after passing through the lens assembly. FIG. 16b illustrates an astigmatic curve of the optical imaging lens group according to Embodiment 8, representing a curvature of a tangential image plane and a curvature of a sagittal image plane. FIG. 16c illustrates a distortion curve of the optical imaging lens group according to Embodiment 8, representing amounts of distortion corresponding to different image heights. FIG. 16d illustrates a lateral color curve of the optical imaging lens group according to Embodiment 8, representing deviations of different image heights on the image plane after light passes through the lens assembly. It can be seen from FIGS. 16a-16d that the optical imaging lens group given in Embodiment 8 can achieve a good imaging quality.

The foregoing embodiments are only preferred embodiments of the present disclosure, and are not intended to limit the present disclosure. Any modification, improvement, equivalent substitution, etc. made within the spirit and principle of the present disclosure shall fall within the scope of protection of the present disclosure.

What is claimed is:

1. An optical imaging lens group, comprising, sequentially along an optical axis from an object side to an image side:
   a first lens, having a refractive power, an object-side surface of the first lens being a concave surface;
   a second lens, having a positive refractive power, wherein an object-side surface of the second lens is a convex surface;
   a third lens, having a refractive power, an image-side surface of the third lens being a concave surface;
   a fourth lens, having a refractive power;
   a fifth lens, having a positive refractive power, wherein an object-side surface of the fifth lens is a convex surface, and an image-side surface of the fifth lens is a convex surface;
   a sixth lens, having a negative refractive power;
   a seventh lens, having a refractive power, wherein an object-side surface of the seventh lens is a convex surface, and an image-side surface of the seventh lens is a convex surface; and
   an eighth lens, having a negative refractive power, wherein an image-side surface of the eighth lens is a concave surface,
   wherein a number of lenses having refractive powers in the optical imaging lens group is eight,
   half of a maximal field-of-view Semi-FOV of the optical imaging system satisfies: Semi-FOV>60°, and
   an optical distortion Dist. of the optical imaging system satisfies: |Dist.|≤5.1%.

2. The optical imaging lens group according to claim 1, wherein an effective focal length f7 of the seventh lens and an effective focal length f8 of the eighth lens satisfy: 0<f8/(f8-f7)<1.0.

3. The optical imaging lens group according to claim 1, wherein a combined focal length f23 of the second lens and the third lens and a combined focal length f456 of the fourth lens, the fifth lens and the sixth lens satisfy: 0.3<f456/f23<1.3.

4. The optical imaging lens group according to claim 1, wherein a radius of curvature R16 of the image-side surface of the eighth lens and a maximal effective radius DT82 of the image-side surface of the eighth lens satisfy: 0<R16/DT82<1.5.

5. The optical imaging lens group according to claim 1, wherein a center thickness CT5 of the fifth lens on the optical axis and an edge thickness ET5 of the fifth lens satisfy: 0<ET5/CT5<1.0.

6. The optical imaging lens group according to claim 1, wherein a center thickness CT8 of the eighth lens on the optical axis and an edge thickness ET8 of the eighth lens satisfy: 0<CT8/ET8<1.0.

7. The optical imaging lens group according to claim 1, wherein an edge thickness ET1 of the first lens and an axial distance SAG12 from an intersection point of an image-side surface of the first lens and the optical axis to a vertex of an effective radius of the image-side surface of the first lens satisfy: 0.5<ET1/SAG12<1.0.

8. The optical imaging lens group according to claim 1, wherein an axial distance SAG21 from an intersection point of the object-side surface of the second lens and the optical axis to a vertex of an effective radius of the object-side surface of the second lens and an axial distance SAG22 from an intersection point of an image-side surface of the second lens and the optical axis to a vertex of an effective radius of the image-side surface of the second lens satisfy: 0.5<SAG22/SAG21<1.5.

9. The optical imaging lens group according to claim 1, wherein an edge thickness ET6 of the sixth lens and an edge thickness ET7 of the seventh lens satisfy: 0<ET7/ET6<0.5.

10. The optical imaging lens group according to claim 1, wherein an effective focal length f1 of the first lens, a radius of curvature R1 of the object-side surface of the first lens, and a radius of curvature R2 of an image-side surface of the first lens satisfy: 0<f1/(R1+R2)<1.0.

11. The optical imaging lens group according to claim 1, wherein an effective focal length f4 of the fourth lens, an effective focal length f5 of the fifth lens and an effective focal length f6 of the sixth lens satisfy: 0.5<(f5−f6)/f4<2.0.

12. The optical imaging lens group according to claim 1, wherein a radius of curvature R3 of the object-side surface of the second lens, a radius of curvature R5 of an object-side surface of the third lens and a radius of curvature R6 of the image-side surface of the third lens satisfy: 0<R3/(R5+R6)<1.0.

13. The optical imaging lens group according to claim 1, wherein a radius of curvature R13 of the object-side surface of the seventh lens and a radius of curvature R14 of the image-side surface of the seventh lens satisfy: 0<R14/(R14−R13)<1.0.

14. The optical imaging lens group according to claim 1, wherein a radius of curvature R9 of the object-side surface of the fifth lens and a radius of curvature R10 of the image-side surface of the fifth lens satisfy: 0.5<R9/(R9−R10)<1.0.

15. The optical imaging lens group according to claim 1, wherein a center thickness CT6 of the sixth lens on the optical axis and a maximal effective radius DT61 of an object-side surface of the sixth lens satisfy: 0.2<CT6/DT61<0.7.

16. The optical imaging lens group according to claim 1, wherein a center thickness CT1 of the first lens on the optical axis, a center thickness CT2 of the second lens on the optical axis, a center thickness CT3 of the third lens on the optical axis and a center thickness CT4 of the fourth lens on the optical axis satisfy: 0.3<(CT1+CT2)/(CT3+CT4)<0.8.

17. The optical imaging lens group according to claim 1, wherein a center thickness CT7 of the seventh lens on the optical axis and a sum of air spacings ΣAT between any two adjacent lenses in the first to eighth lenses on the optical axis satisfy: 0.3<CT7/ΣAT<0.8.

18. An optical imaging lens group, comprising, sequentially along an optical axis from an object side to an image side:
a first lens, having a refractive power, an object-side surface of the first lens being a concave surface;
a second lens, having a positive refractive power, wherein an object-side surface of the second lens is a convex surface;
a third lens, having a refractive power, an image-side surface of the third lens being a concave surface;
a fourth lens, having a refractive power;
a fifth lens, having a positive refractive power, wherein an object-side surface of the fifth lens is a convex surface, and an image-side surface of the fifth lens is a convex surface;
a sixth lens, having a negative refractive power;
a seventh lens, having a refractive power, wherein an object-side surface of the seventh lens is a convex surface, and an image-side surface of the seventh lens is a convex surface; and
an eighth lens, having a negative refractive power, wherein the image-side surface of the eighth lens is a concave surface,
wherein a number of lenses having refractive powers in the optical imaging lens group is eight,
half of a maximal field-of-view Semi-FOV of the optical imaging system satisfies: Semi-FOV>60°; and
a center thickness CT1 of the first lens on the optical axis, a center thickness CT2 of the second lens on the optical axis, a center thickness CT3 of the third lens on the optical axis and a center thickness CT4 of the fourth lens on the optical axis satisfy: 0.3<(CT1+CT2)/(CT3+CT4)<0.8.

19. The optical imaging lens group according to claim 18, wherein a combined focal length f23 of the second lens and the third lens and a combined focal length f456 of the fourth lens, the fifth lens and the sixth lens satisfy: 0.3<f456/f23<1.3.

* * * * *